(12) United States Patent
Davis et al.

(10) Patent No.: US 12,120,124 B1
(45) Date of Patent: Oct. 15, 2024

(54) LIVE APP TESTING WITHIN AN APP EDITOR FOR AN INFORMATION TECHNOLOGY AND SECURITY OPERATIONS APPLICATION

(71) Applicant: Splunk Inc., San Francisco, CA (US)

(72) Inventors: Jacob Davis, Campbell, CA (US); Dekel Shahaff, Santa Cruz, CA (US); Jeffrey Roecks, San Carlos, CA (US); Sydney Flak, Seattle, WA (US); Navya Mehta, Waterloo (CA); Ian Forrest, Carlsbad, CA (US); Sydney Karimi, Aliso Viejo, CA (US); Elton Xue, Irvine, CA (US)

(73) Assignee: Splunk Inc., San Francisco, CA (US)

( * ) Notice: Subject to any disclaimer, the term of this patent is extended or adjusted under 35 U.S.C. 154(b) by 329 days.

(21) Appl. No.: 17/588,843

(22) Filed: Jan. 31, 2022

(51) Int. Cl.
*G06F 8/20* (2018.01)
*G06F 8/30* (2018.01)
(Continued)

(52) U.S. Cl.
CPC .............. *H04L 63/105* (2013.01); *G06F 8/30* (2013.01); *G06F 8/71* (2013.01); *H04L 63/102* (2013.01);
(Continued)

(58) Field of Classification Search
CPC ....... H04L 63/105; H04L 63/102; G06F 8/30; G06F 8/71; G06F 8/33; G06F 8/77;
(Continued)

(56) References Cited

U.S. PATENT DOCUMENTS

| 7,937,344 B2 | 5/2011 | Baum et al. |
| 8,112,425 B2 | 2/2012 | Baum et al. |

(Continued)

OTHER PUBLICATIONS

Chadni Islam et al., Architecture-centric Support for Integrating Security Tools in a Security Orchestration Platform, 2020, [Retrieved on Apr. 22, 2024]. Retrieved from the internet: <URL: https://www.researchgate.net/profile/Chadni-Islam/publication/344260727> 16 Pages (1-16) (Year: 2020).*

(Continued)

*Primary Examiner* — Anibal Rivera
(74) *Attorney, Agent, or Firm* — NICHOLSON DE VOS WEBSTER & ELLIOTT LLP

(57) ABSTRACT

Techniques are described for providing a built-in "app" editor for an information technology (IT) and security operations application that enables users to create, modify, and test operation of apps under development within the editor. Some IT and security operations applications enable users to extend the applications by adding connectivity to third party technologies to run custom actions. For example, a user might create a custom app to enable an IT and security operations application to connect to an external service providing information about malicious Internet Protocol (IP) addresses, to connect to a relevant cloud provider service, or to interact with a firewall or other type of computing device used in a user's computing environment. Given the broad set of technologies that can be orchestrated by an IT and security operations application, apps broadly enable users to add custom functionality to interface with virtually any technology of interest.

20 Claims, 16 Drawing Sheets

(51) Int. Cl.
- *G06F 8/33* (2018.01)
- *G06F 8/41* (2018.01)
- *G06F 8/71* (2018.01)
- *H04L 9/40* (2022.01)
- *G06F 8/72* (2018.01)
- *G06F 8/77* (2018.01)
- *G06F 11/34* (2006.01)
- *G06F 11/36* (2006.01)

(52) U.S. Cl.
CPC .............. *G06F 8/33* (2013.01); *G06F 8/72* (2013.01); *G06F 8/77* (2013.01); *G06F 11/3438* (2013.01); *G06F 11/3688* (2013.01); *G06F 11/3692* (2013.01)

(58) Field of Classification Search
CPC .... G06F 8/72; G06F 11/3688; G06F 11/3692; G06F 11/3438; G06F 11/36
See application file for complete search history.

(56) References Cited

U.S. PATENT DOCUMENTS

| | | | |
|---|---|---|---|
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 9,679,090 B1* | 6/2017 | Marolia | G06F 11/34 |
| 10,127,258 B2 | 11/2018 | Lamas et al. | |
| 10,725,890 B1* | 7/2020 | Goyal | H04L 63/029 |
| 10,795,649 B1* | 10/2020 | Drake | H04L 63/101 |
| 11,074,512 B1* | 7/2021 | Forte | G06F 18/22 |
| 11,579,868 B1* | 2/2023 | Zhang | G06F 8/72 |
| 2013/0174122 A1* | 7/2013 | Watters | G06F 8/36 717/121 |
| 2019/0098106 A1 | 3/2019 | Mungel et al. | |
| 2019/0294613 A1* | 9/2019 | Sullivan | G06F 16/2455 |
| 2020/0320557 A1* | 10/2020 | Fuchs | G06F 11/3672 |
| 2021/0124561 A1* | 4/2021 | Pezaris | G06F 8/77 |

OTHER PUBLICATIONS

Splunk Enterprise 8.0.0 Overview, available online, retrieved May 20, 2020 from docs.splunk.com.

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carasso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

\* cited by examiner

FIG. 4

LIVE APP TESTING WITHIN AN APP EDITOR FOR AN INFORMATION TECHNOLOGY AND SECURITY OPERATIONS APPLICATION

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

The ability to monitor the operation and security of even a moderately complex computing environment typically involves a large number of tasks including, for example, investigating alerts generated by various operational and security monitoring applications, performing tasks to detect, triage, and respond to identified threats, and the like. To aid users with these and other tasks, information technology (IT) and security operations applications (sometimes referred to as Security Orchestration, Automation, and Response (SOAR) applications) provide capabilities to automate many repetitive tasks, to triage security incidents faster with automated detection, investigation, and response, and to strengthen defenses by connecting and coordinating complex workflows across security analyst teams and tools.

BRIEF DESCRIPTION OF THE DRAWINGS

Illustrative examples are described in detail below with reference to the following figures:

FIG. 4 illustrates an example app wizard interface of a built-in app editor for an IT and security operations application according to some examples.

DETAILED DESCRIPTION

Figure 1:
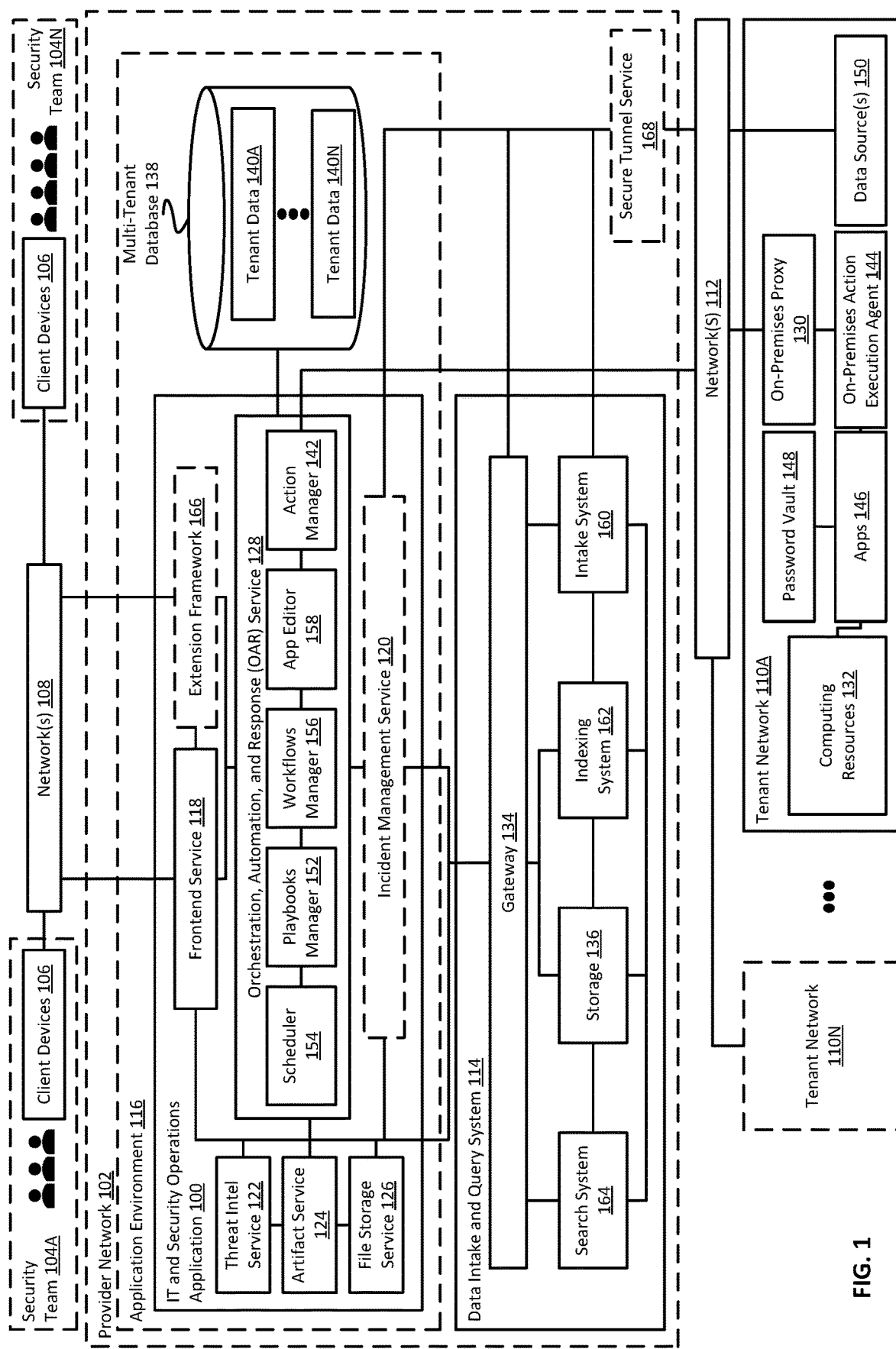
FIG. 1 is a block diagram of an example computing environment including an IT and security operations application that enables users to create, modify, and test apps using a built-in app editor according to some examples.

The present disclosure relates to methods, apparatus, systems, and non-transitory computer-readable storage media for providing a built-in "app" editor that enables users of an IT and security operations application to create, modify, and test operation of apps under development within the editor. Some IT and security operations applications, for example, enable users to extend the applications by adding connectivity to third party technologies and devices to run custom actions. A user might create a custom app, for example, to enable an IT and security operations application to connect to an external service providing information about malicious Internet Protocol (IP) addresses, to connect to a cloud provider service providing computing resources used within the user's computing environment, to interact with a firewall or other type of computing device in the user's computing environment, among many other possible use cases. Given the broad set of technologies that can be orchestrated by an IT and security operations application, apps broadly enable users to add custom functionality to interface with virtually any relevant technology of interest.

In some examples, an app for an IT and security operations application is developed in part using program code (e.g., Python or other programming language-based code) to specify logic designed to create a bridge between the IT security and operations application and other computing devices, applications, and services. For example, at a high level, an app can be configured to receive action requests to be carried out on behalf of an IT and security operations application, to translate the action requests into specific commands used to interface with one or more types of devices or services, to obtain any result data based on execution of the action, and to return the result data to the IT and security operations application for further processing. To implement such functionality, an app typically includes several standard components including, e.g., source code files implementing the one or more actions provided by the app, optional code and display information used to specify how information related to the app is rendered and displayed within the IT and security operations application, and metadata describing the app and functionality that the app provides.

To create an app, developers presently write the program code for the app using a local code development tool (e.g., a source code editor, possibly utilizing an app template provided by the IT and security operations application). Once complete, a developer imports the code and associated metadata as a package into the IT and security operations application for installation. However, this process can be inefficient and error-prone for several reasons. As one example, users can detect errors in their source code or code dependencies only once an app is packaged in a user's local development environment, installed within the IT and security operation application, and the user attempts to execute the app within the application. Debugging output might not also be readily available to users trying to understand why an app is failing to execute or otherwise not operating as intended. Furthermore, the manual packaging and installation of apps from a user's development environment lacks a consistent process for testing and publishing apps to general users only once a user confirms the expected operation of an app.

To address these challenges, among others, examples described herein provide a built-in app editor for an IT and security operations application that enables users to develop, test, debug, and publish apps and app actions directly within the IT and security operations application. Among other features, the app editor includes a workflow that users can use to create, test, and debug actions with live console output, interfaces enabling users to implement real-time updates to configurations, dependencies, and app code, and further enables users to attach device or service relationships (e.g., assets) inside the editor for testing. The improved ability to create and test apps within such an app editor enables the more efficient development of apps for an IT and security operations application, thereby enabling better security and operational response within users' computing environments including diverse collections of technologies.

FIG. 1 is a block diagram of an example computing environment including an IT and security operations application that enables users to create, modify, and test apps using a built-in app editor according to some examples. As shown in FIG. 1, an IT and security operations application 100 comprises software components executed by one or more electronic computing devices. In some examples, the computing devices are provided by a cloud provider network 102 (e.g., as part of a shared computing resource environment). In other examples, an IT and security operations application 100 executes on computing devices managed within an on-premises datacenter or other computing environment, or on computing devices located within a combination of cloud-based and on-premises computing environments.

The IT and security operations application 100 broadly enables users to perform security orchestration, automation, and response operations involving components of an organization's computing infrastructure (or components of multiple organizations' computing infrastructures). Among other benefits, an IT and security operations application 100 enables security teams and other users to automate repetitive tasks, to efficiently respond to security incidents and other operational issues, and to coordinate complex workflows across security teams and diverse IT environments. For example, users associated with various IT operations or security teams (sometimes referred to herein as "analysts," such as analysts that may be part of example one or more of security team 104A, . . . , security team 104N) can use client computing devices 106 to interact with the IT and security operations application 100 via one or more network(s) 108 to perform operations relative to IT environments for which they are responsible (such as, for example, one or more of tenant network 110A, . . . , tenant network 110N, which may be accessible over one or more network(s) 112, where network(s) 112 may be the same or different from network(s) 108). Although only two security teams are depicted in the example of FIG. 1, in general, any number of separate security teams can concurrently use the IT and security operations application 100 to manage any number of respective tenant networks, where each individual security team may be responsible for one or more tenant networks.

In some examples, users can interact with an IT and security operations application 100 and a data intake and query system 114 (described in more detail elsewhere herein) using client devices 106. The client devices 106 can communicate with the IT and security operations application 100 and with data intake and query system 114 in a variety of ways such as, for example, over an internet protocol via a web browser or other application, via a command line interface, via a software developer kit (SDK), and the like. In some examples, the client devices 106 can use one or more executable applications or programs from an application environment 116 to interface with the data intake and query system 114, such as the IT and security operations application 100. In some examples, the application environment 116 include tools, software modules (e.g., computer executable instructions to perform a particular function), etc., that enable application developers to create computer executable applications to interface with an IT and security operations application 100 and/or data intake and query system 114. The IT and security operations application 100, for example, can use aspects of the application environment 116 to interface with the data intake and query system 114 to obtain relevant data, process the data, and display it in a manner relevant to the IT operations and security context. As shown, the IT and security operations application 100 further includes additional backend services, middleware logic, front-end user interfaces, data stores, and other computing resources, and provides other facilities for ingesting use case specific data and interacting with that data, as described elsewhere herein.

As an example of using the application environment 116, the IT and security operations application 100 includes custom web-based interfaces (e.g., provided at least in part by a frontend service 118) that optionally leverage one or more user interface components and frameworks provided by the application environment 116. In some examples, an IT and security operations application 100 includes, for example, a "mission control" interface or set of interfaces. In this context, "mission control" refers to any type of interface or set of interfaces that broadly enable users to obtain information about their IT environments, to configure automated actions, playbooks, etc., and to perform operations related to IT and security infrastructure management. The IT and security operations application 100 further includes middleware business logic (including, for example, an optional incident management service 120, a threat intelligence service 122, an artifact service 124, a file storage service 126, and an orchestration, automation, and response (OAR) service 128) implemented on a middleware platform of the developer's choice. Furthermore, in some examples, an IT and security operations application 100 is instantiated and executed in a different isolated execution environment relative to the data intake and query system 114. As a non-limiting example, in examples where the data intake and query system 114 is implemented at least in part in a Kubernetes cluster, the IT and security operations application 100 can execute in a different Kubernetes cluster (or other isolated execution environment system) and interact with the data intake and query system 114 via the gateway 134.

In some examples, where an IT and security operations application 100 is deployed in a tenant network, the application can instead be deployed as a virtual appliance at one or more computing devices managed by an organization using the IT and security operations application 100. A virtual appliance, for example, can include a VM image file that is pre-configured to run on a hypervisor or directly on the hardware of a computing device and that includes a pre-configured operating system upon which the IT and security operations application 100 executes. In other examples, the IT and security operations application 100 can be provided and installed using other types of standalone software installation packages or software package management systems. Depending on the implementation and user preference, an IT and security operations application 100 optionally can be configured on a standalone server or in a clustered configuration across multiple separate computing devices.

A user can initially configure an IT and security operations application 100 using a web-based console or other interface provided by the IT and security operations application 100 (for example, as provided by a frontend service 118 of the IT and security operations application 100). For example, users can use a web browser or other application to navigate to the IP address or hostname associated with the IT and security operations application 100 to access console interfaces, dashboards, and other interfaces used to interact with various aspects of the application. The initial configuration can include creating and configuring user accounts, configuring connection settings to one or more tenant networks (for example, including settings associated with one or more on-premises proxies 130 used to establish connections between on-premises networks and the IT and security operations application 100 running in a provider network 102 or elsewhere), and performing other optional configurations.

In some examples, a user (also referred to herein as a "customer," "tenant," or "analyst") of an IT and security operations application 100 can create one or more user accounts to be used by a security team and other users associated with the tenant. A user of the IT and security operations application 100 typically desires to use the application to manage one or more tenant networks for which the user is responsible (illustrated by example tenant networks 110A, . . . , 110N in FIG. 1). A tenant network includes any number of computing resources 132 operating as part of a corporate network or other networked computing environment with which a tenant is associated. Although the tenant networks 110A, . . . , 110N are shown as separate from the provider network 102 in FIG. 1, more generally, a tenant network can include components hosted in an on-premises network, in a provider network 102, or combinations of both (for example, as a hybrid cloud network).

In some examples, each of the computing resources 132 in a tenant network can potentially serve as a source of incident data to an IT and security operations application 100, a computing resource against which actions can be performed by the IT and security operations application 100, or both. The computing resources 132 can include various types of computing devices, software applications, and services including, but not limited to, a data intake and query system 114 (which itself can ingest and process machine data generated by other computing resources 132), a security information and event management (SIEM) system, a representational state transfer (REST) client that obtains or generates incident data based on the activity of other computing resources 132, software applications (including operating systems, databases, web servers, etc.), routers, intrusion detection systems and intrusion prevention systems (IDS/IDP), client devices (for example, servers, desktop computers, laptops, tablets, etc.), firewalls, and switches. The computing resources 132 can execute upon any number separate computing devices and systems within a tenant network.

During operation, data intake and query systems, SIEM systems, REST clients, and other system components of a tenant network obtain operational, performance, and security data from computing resources 132 in the network, analyze the data, and may identify potential IT and security-related incidents from time to time. A data intake and query system in a tenant network, for example, might identify potential IT-related incidents based on the execution of correlation searches against data ingested and indexed by the system, as described elsewhere herein. Other data sources 150 can obtain incident and security-related data using other processes. Once obtained, data indicating such incidents is sent to the data intake and query system 114 or IT and security operations application 100 via an on-premises proxy 130. For example, once a data intake and query system identifies a possible security threat or other IT-related incident based on data ingested by the data intake and query system, data representing the incident can be sent to the data intake and query system 114 via a REST API endpoint implemented by a gateway 134 or a similar gateway of the IT and security operations application 100. As mentioned elsewhere herein, a data intake and query system 114 or IT and security operations application 100 can ingest, index, and store data received from each tenant network in association with a corresponding tenant identifier such that each tenant's data is segregated from other tenant data (for example, when stored in common storage 136 of the data intake and query system 114 or in a multi-tenant database 138 of the IT and security operations application 100).

As mentioned, in some examples, some or all of the data ingested and created by an IT and security operations application 100 in association with a particular tenant is generally maintained separately from other tenants (for example, as illustrated by tenant data 140A, . . . , tenant data 140N in the multi-tenant database 138). In some examples, a tenant may further desire to keep data associated with two or more separate tenant networks segregated from one another. For example, a security team associated with a managed security service provider (MSSP) may be responsible for managing any number of separate tenant networks for various customers of the MSSP. As another example, a tenant corresponding to a business organization having large, separate departments or divisions may desire to logically isolate the data associated with each division. In such instances, a tenant can configure separate "departments" in the IT and security operations application 100, where each department is associated with a respective tenant network or other defined collection of data sources, computing resources, and so forth. Users and user teams can thus use this feature to manage multiple third-party entities or organizations using only a single login and permissions configuration for the IT and security operations application 100.

In some examples, once an IT and security operations application 100 obtains incident data, either directly from a tenant network or indirectly via a data intake and query system 114, the IT and security operations application 100 analyzes the incident data and enables users to investigate, determine possible remediation actions, and perform other operations. These actions can include default actions initiated and performed within a tenant network without direct interaction from user and can further include suggested actions provided to users associated with the relevant tenant networks. Once the suggested actions are determined, these actions can be presented in a "mission control" dashboard or other interface accessible to users of the IT and security operations application 100. Based on the suggested actions, a user can select one or more particular actions to be performed and the IT and security operations application 100 can carry out the selected actions within the corresponding tenant network. In the example of FIG. 1, an orchestration, automation, and response (OAR) service 128 of the IT and security operations application 100, which includes an action manager 142, can cause actions to be performed in a tenant network by sending action requests via network 112 to an on-premises proxy 130, which further interfaces with an on-premises action execution agent (for example, on-premises action execution agent 144 in tenant network 110A). In this example, the on-premises action execution agent 144 is implemented to receive action requests from an action manager 142 and to carry out requested actions against computing resources 132 using apps 146 (sometimes alternatively referred to as "connectors") and optionally a password vault 148 (e.g., to authenticate an app to one or more computing resources 132).

In some examples, to execute actions against computing resources in tenant networks and elsewhere, an IT and security operations application 100 uses a unified security language that includes commands usable across a variety of hardware and software products, applications, and services. To execute a command specified using the unified security language, in some examples, the IT and security operations application 100 (possibly via an on-premises action execution agent 144) uses one or more apps 146 to translate the commands into the one or more processes, languages, scripts, etc., necessary to implement the action at one or more particular computing resources 132. For example, a user might provide input requesting the IT and security operations application 100 to remove an identified malicious process from multiple computing systems in the tenant network 110A, where two or more of the computing systems are associated with different software configurations (for example, different operating systems or operating system versions). Accordingly, in some examples, the IT and security operations application 100 can send an action request to an on-premises action execution agent 144, which then uses one or more apps 146 to translate the command into the necessary processes to remove each instance of the malicious process on the varying computing systems within the tenant network (including the possible use of credentials and other information stored in the password vault 148).

In some examples, an IT and security operations application 100 includes a playbooks manager 152 that enables users to automate actions or series of actions by creating digital "playbooks" that can be executed by the IT and security operations application 100. At a high level, a playbook represents a customizable computer program that can be executed by an IT and security operations application 100 to automate a wide variety of possible operations related to an IT environment. These operations-such as quarantining devices, modifying firewall settings, restarting servers, and so forth—are typically performed by various security products by abstracting product capabilities using an integrated "app model." Additional details related to operation of the IT and security operations application 100 and use of digital playbooks are provided elsewhere herein.

As mentioned, an IT and security operations application 100 may be implemented as a collection of interworking services that each carry out various functionality as described herein. In the example shown in FIG. 1, the IT and security operations application 100 includes an incident management service 120, a frontend service 118, an artifact service 124, a threat intelligence service 122, a file storage service 126, and an orchestration, automation, and response (OAR) service 128. The set of services comprising the IT and security operations application 100 in FIG. 1 are provided for illustrative purposes only; in other examples, an IT and security operations application 100 can be comprised of more or fewer services and each service may implement the functionality of one or more of the services shown.

In some examples, an incident management service 120 is responsible for obtaining incidents or events (sometimes also referred to as "notables"), either directly from various data sources 150 in tenant networks or directly based on data ingested by the data intake and query system 114 via the gateway 134. In some examples, the frontend service 118 provides user interfaces to users of the application, among other processes described herein. Using these user interfaces, users of the IT and security operations application 100 can perform various application-related operations, view displays of incident-related information, and can configure administrative settings, license management, content management settings, and so forth. In some examples, an artifact service 124 manages artifacts associated with incidents received by the application, where incident artifacts can include information such as IP addresses, usernames, file hashes, and so forth. In some examples, a threat intelligence service 122 obtains data from external or internal sources to enable other services to perform various incident data enrichment operations. As one non-limiting example, if an incident is associated with a file hash, a threat intelligence service 122 can be used to correlate the file hash with external threat feeds to determine whether the file hash has been previously identified as malicious. In some examples, a file storage service 126 enables other services to store incident-related files, such as email attachments, files, and so forth. In some examples, an OAR service 128 performs a wide range of OAR capabilities such as action execution (via an action manager 142), playbook execution (via a playbooks manager 152), scheduling work to be performed (via a scheduler 154), user approvals and so forth as workflows (via a workflows manager 156), among other functionality described herein. According to examples described herein, an OAR service 128 includes an app editor 158 that enables users to create, modify, and test apps (e.g., including apps 146 utilized within a local tenant network, apps used by an IT and security operations application 100 running in a provider network 102, or used elsewhere) using the built-in app editor, as described in more detail herein.

The operation of an IT and security operations application 100 generally begins with the ingestion of data related to various types of incidents involving computing resources of various tenant networks (for example, computing resources 132 or other data sources 150 of a tenant network 110A). In some examples, users configure an IT and security operations application 100 to obtain, or "ingest," data from one or more defined data sources 150, where such data sources can be any type of computing device, application, or service that supplies information that users may want to store or act upon, and where such data sources may include one or more of the computing resources 132 or data sources which generate data based on the activity of one or more computing resources 132. As mentioned, examples of data sources include, but are not limited to, a data intake and query system such as the SPLUNK® ENTERPRISE system, a SIEM system, a REST client, applications, routers, intrusion detection systems (IDS)/intrusion prevention systems (IDP) systems, client devices, firewalls, switches, or any other source of data identifying potential incidents in tenants' IT environments. Some of these data sources may themselves collect and process data from various other data generating components such as, for example, web servers, application servers, databases, firewalls, routers, operating systems, and software applications that execute on computer systems, mobile devices, sensors, Internet of Things (IoT) devices, etc. The data generated by the various data sources can be represented in any of a variety of data formats.

In some examples, data can be sent from tenant networks to an IT and security operations application 100 using any of several different mechanisms. As one example, data can be sent to data intake and query system 114, processed by an intake system 160 (e.g., including indexing of resulting event data by an indexing system 162, thereby further causing the event data to be accessible to a search system 164), and obtained by an incident management service 120 of the IT and security operations application 100 via a gateway 134. As another example, components can send data from a tenant network directly to the incident management service 120, for example, via a REST endpoint.

In some examples, data ingested by an IT and security operations application 100 from configured data sources 150 can be represented in the IT and security operations application 100 by data structures referred to as "incidents," "events," "notables," or "containers". Here, an incident or event is a structured data representation of data ingested from a data source and that can be used throughout the IT and security operations application 100. In some examples, an IT and security operations application 100 can be configured to create and recognize different types of incidents depending on the corresponding type of data ingested, such as "IT incidents" for IT operations-related incidents, "security incidents" for security-related incidents, and so forth. An incident can further include any number of associated events and "artifacts," where each event or artifact represents an item of data associated with the incident. As a non-limiting example, an incident used to represent data ingested from an anti-virus service and representing a security-related incident might include an event indicating the occurrence of the incident and associated artifacts indicating a name of the virus, a hash value of a file associated with the virus, a file path on the infected endpoint, and so forth.

In some examples, each incident of an IT and security operations application 100 can be associated with a "status" or "state" that may change over time. Analysts and other users can use this status information, for example, to indicate to other analysts which incidents an analyst is actively investigating, which incidents have been closed or resolved, which incidents are awaiting input or action, and the like. Furthermore, an IT and security operations application 100 can use the transitions of incidents from one status to another to generate various metrics related to analyst efficiency and other measurements of analyst teams. For example, the IT and security operations application 100 can be configured with a number of default statuses, such as "new" or "unknown" to indicate incidents that have not yet been analyzed, "in progress" for incidents that have been assigned to an analyst and are under investigation, "pending" for incidents that are waiting input or action from an analyst, and "resolved" for incidents that have been addressed by an assigned analyst. An amount of time that elapses between these statuses for a given incident can be used to calculate various measures of analyst and analyst team efficiency, such as measurements of a mean time to resolve incidents, a mean time to respond to incidents, a mean time to detect an incident that is a "true positive," a mean dwell time reflecting an amount of time taken to identify and remove threats from an IT environment, among other possible measures. Analyst teams can also create custom statuses to indicate incident states that may be more specific to the way the particular analyst team operates, and further create custom efficiency measurements based on such custom statuses.

In some examples, an IT and security operations application 100 also generates and stores data related to its operation and activity conducted by tenant users including, for example, playbook data, workbook data, user account settings, configuration data, and historical data (such as, for example, data indicating actions taken by users relative to particular incidents or artifacts, data indicating responses from computing resources based on action executions, and so forth), in one or more multi-tenant databases 138. In other examples, some or all the data above is stored in storage managed by the data intake and query system 114 and accessed via the gateway 134. These multi-tenant database(s) 138 can operate on a same computer system as the IT and security operations application 100 or at one or more separate database instances. As mentioned, in some examples, the storage of such data by the data intake and query system 114 and IT and security operations application 100 for each tenant is generally segregated from data associated with other tenants based on tenant identifiers stored with the data or other access control mechanisms.

In some examples, an IT and security operations application 100 defines many different types of "actions," which represent high-level, vendor- and product-agnostic primitives that can be used throughout the IT and security operations application 100. Actions generally represent simple and user-friendly verbs that are used to execute actions in playbooks or manually through other user interfaces of the IT and security operations application 100, where such actions can be performed against one or more computing resources in an IT environment. In many cases, a same action defined by the IT and security operations application 100 can be carried out on computing resources associated with different vendors or configurations via action translation processes performed by apps of the platform, as described in more detail elsewhere herein. Examples of actions that can be defined by an IT and security operations application 100 include a "get process dump" action, a "block IP address" action, a "suspend VM" action, a "terminate process" action, and so forth.

In some examples, an IT and security operations application 100 enables connectivity with various IT computing resources in a provider network 102 and in tenant networks 110A, . . . , 110N, including IT computing resources from a wide variety of third-party IT and security technologies, and further enables the ability to execute actions against those computing resources via apps (such as the apps 146 in tenant network 110A and apps implemented as part of the IT and security operations application 100). In general, an app 146 represents program code that provides an abstraction layer (for example, via one or more libraries, APIs, or other interfaces) to one or more of hundreds of possible IT and security-related products and services and which exposes lists of actions supported by those products and services. Each app 146 can also define which types of computing resources that the app can operate on, an entity that created the app, among other information.

As one example, an IT and security operations application 100 can be configured with an app 146 that enables the application 100 to communicate with a VM product provided by a third-party vendor. In this example, the app for the VM product enables the IT and security operations application 100 to take actions relative to VM instances within a user's IT environment, including starting and stopping the VMs, taking VM snapshots, analyzing snapshots, and so forth. In order for the app 146 to communicate with a VM manager or with individual instances, the app 146 can be configured with login credentials, hostnames or IP addresses, and so forth, for each instance with which communication is desired (or the app may be configured to obtain such information from a password vault 148). Other apps 146 can be created and made available for VM products from other third-party vendors, where those apps may be configured to translate some or all the same actions that are available with respect to the first type of VM product. In general, apps 146 enable interaction with virtually any type of computing resource 132 in an IT environment and can be added and updated over time to support new types of computing resources.

In some examples, computing resources 132 (sometimes referred to as computing assets) include physical or virtual components within an organization with which an IT and security operations application 100 communicates (for example, via apps as described above). Examples of computing resources 132 include, but are not limited to, servers, endpoint devices, applications, services, routers, and firewalls. A computing resource 132 can be represented in an IT and security operations application 100 by data identifying the computing resource, including information used to communicate with the device or service such as, for example, an IP address, automation service account, username, password, etc. In some examples, one or more computing resources 132 can be configured as a source of incident information that is ingested by an IT and security operations application 100. The types of computing resources 132 that can be configured in the IT and security operations application 100 may be determined in some cases based on which apps 146 are installed for a particular user. In some examples, automated actions can be configured with respect to various computing resources 132 using playbooks, described in more detail elsewhere herein. Each computing resource 132 may be hosted in an on-premises tenant network, a cloud-based provider network, or any other network or combination thereof.

In some examples, the operation of an IT and security operations application 100 includes the ability to create and execute customizable playbooks. At a high level, a playbook comprises computer program code and possibly other data that can be executed by an IT and security operations application 100 to carry out an automated set of actions (for example, as managed by a playbooks manager 152 as part of the OAR service 128). In some examples, a playbook is comprised of one or more functions, or codeblocks or function blocks, where each function contains program code that performs defined functionality when the function is encountered during execution of the playbook of which it is a part. As an example, a first function block of a playbook might implement an action that upon execution affects one or more computing resources 132 (e.g., by configuring a network setting, restarting a server, etc.); another function block might filter data generated by the first function block in some manner; yet another function block might obtain information from an external service, and so forth. A playbook is further associated with a control flow that defines an order in which the IT and security operations application 100 executes the function blocks of the playbook, where a control flow may vary at each execution of a playbook depending on particular input conditions (e.g., where the input conditions may derive from attributes associated with an incident triggering execution of the playbook or based on other accessible values).

In some examples, the IT and security operations application 100 described herein provides a visual playbook editor (for example, as an interface provided by a frontend service 118) that allows users to visually create and modify playbooks. Using a visual playbook editor GUI, for example, users can codify a playbook by creating and manipulating a displayed graph including nodes and edges, where each of the nodes in the graph represents one or more function blocks that each perform one or more defined operations during execution of the playbook, and where the edges represent a control flow among the playbook's function blocks. In this manner, users can craft playbooks that perform complex sequences of operations without having to write some or any of the underlying code. The visual playbook editor interfaces further enable users to supplement or modify the automatically generated code by editing the code associated with a visually designed playbook, as desired.

In some examples, an IT and security operations application 100 provides one or more playbook management interfaces that enable users to locate and organize playbooks associated with a user's account. A playbook management interface can display a list of playbooks that are associated with a user's account and further provide information about each playbook such as, for example, a name of the playbook, a description of the playbook's operation, a number of times the playbook has been executed, a last time the playbook was executed, a last time the playbook was updated, tags or labels associated with the playbook, a repository at which the playbook and the associated program code is stored, a status of the playbook, and the like.

In some examples, users can create a new digital playbook starting from a playbook management interface or using another interface provided by the IT and security operations application 100. Using a playbook management interface, for example, a user can select a "create new playbook" interface element and the IT and security operations application 100 causes display of a visual playbook editor interface including a graphical canvas on which users can add nodes representing operations to be performed during execution of the playbook, where the operations are implemented by associated source code that can be automatically generated by the visual playbook editor, and add connections or edges among the nodes defining an order in which the represented operations are to be performed upon execution.

In some examples, the creation of a graph representing a playbook includes the creation of connections between function blocks, where the connections are represented by edges that visually connect the nodes of the graph representing the collection of function blocks. These connections among the playbook function blocks indicate a program flow for the playbook, defining an order in which the operations specified by the playbook blocks are to occur. For example, if a user creates a connection that links the output of a block A to the input of a block B, then block A executes to completion before execution of block B begins during execution of the playbook. In this manner, output variables generated by the execution of block A can be used by block B (and any other subsequently executed blocks) during playbook execution.

Once a user has codified a playbook using a visual playbook editor or other interface, the playbook can be saved (for example, in a multi-tenant database 138 and in association with one or more user accounts) and run by the IT and security operations application 100 on-demand. As illustrated in the example playbooks above, a playbook includes a "start" block that is associated with source code that begins execution of the playbook. More particularly, the IT and security operations application 100 executes the function represented by the start block for a playbook with container context comprising data about the incident against which the playbook is executed, where the container context may be derived from input data from one or more configured data sources. A playbook can be executed manually in response to a user providing input requesting execution of the playbook, or playbooks can be executed automatically in response to the IT and security operations application 100 obtaining input events matching certain criteria. In examples where the source code associated with a playbook is based on an interpreted programming language (for example, such as the Python programming language), the IT and security operations application 100 can execute the source code represented by the playbook using an interpreter and without compiling the source code into compiled code. In other examples, the source code associated with a playbook can first be compiled into byte code or machine code the execution of which can be invoked by the IT and security operations application 100.

In some examples, an optional extension framework 166 allows users to extend the user interfaces, data content, and functionality of an IT and security operations application 100 in various ways to enhance and enrich users' workflow and investigative experiences. Example types of extensions enabled by the extension framework 166 include modifying or supplementing GUI elements (including, e.g., tabs, menu items, tables, dashboards, visualizations, etc.) and other components (including, e.g., response templates, connectors, playbooks, etc.), where users can implement these extensions at pre-defined extension points of the IT and security operations application 100. In some examples, the extension framework 166 further includes a data integration system that provides users with mechanisms to integrate data from external applications, services, or other data sources into their plugins (e.g., to visualize data from any external data source in the IT and security operations application 100 or to otherwise enhance users' investigative experience with data originating outside of the IT and security operations application or data intake and query system 114).

The types of users that might be interested in creating plugins using an extension framework 166 include, for example, development teams associated with a data intake and query system 114, developers of third-party applications or services relevant to the IT and security operations application 100 (e.g., developers of VM management software, cloud computing resource management software, etc.), and other general users of the IT and security operations application 100. Users of the IT and security operations application 100 might, for example, desire to enhance their own workflows and other processes by enabling internal user information lookups, creating internal ticketing system postings, or enabling any other desired visualizations or actions at various points in the IT and security operations application. In some examples, the extension framework 166 enables users to create plugins using "No-Code" development tools, e.g., where users can define the specifications for custom visualizations, data integrations, and other plugin components without direct user coding (e.g., without the direct creation of JavaScript code, JSON specifications, or other data comprising a plugin), although users can also modify the underlying plugin components as desired.

As one example use case for a plugin, consider a cybersecurity company that provides security software that is known to be used by users of the IT and security operations application 100. In this example, developers of the security software might desire for certain information collected or generated by the security software to be visible at various points within the IT and security operations application 100, e.g., to create a tighter integration of the two software applications. The developers, for example, might desire for users of the IT and security operations application 100 to be able to view endpoint information, malware information, etc., collected by the security application when users view various visualizations or other incident information in the IT and security operations application 100 that is associated with the data collected by the security software.

In some examples, developers associated with the cybersecurity company can use the extension framework 166 to create a plugin that integrates the data collected by the security application with the IT and security operations application 100. Users who subscribe to the plugin can then view relevant data or perform other actions when the users navigate to defined extension points of the IT and security operations application 100. Numerous other such use cases exist for a wide variety of applications, data sources, and desired functionality related to an IT and security operations application 100. Among other benefits, the ability to create and use plugins to an IT and security operations application 100 enables security teams to efficiently investigate and remediate a wide variety of incidents that occur from time to time in IT environments, thereby improving the overall security and operation of the IT environments.

In some examples, components external to the IT and security operations application 100 interface with an intermediary secure tunnel service 168 to send communications to, and to receive communications from, an IT and security operations application 100 running in a provider network 102. In some examples, the secure tunnel service 168 operates as a service that establishes WebSocket or other types of secure connections to endpoint devices. As one example, the secure tunnel service 168 can establish a first secure connection to the IT and security operations application 100 and a second secure connection to an on-premises proxy 130 and an on-premises action execution agent 144 executing in a tenant network 110A, where each connection is established using a handshake technique with the respective endpoints. Once established, the connection enables two-way communications between the IT and security operations application 100 (e.g., via a separate proxy implemented by the IT and security operations application 100) and the on-premises action execution agent 144 without the need to open a port in a firewall or perform other configurations to a network associated with the tenant network 110A. In some examples, the secure tunnel service 168 is a cloud-based service (e.g., executing using computing resources provided by a provider network 102) configured to transfer data between an IT and security operations application 100 and computing devices located on networks external to the provider network 102, including on-premises action execution agents, mobile devices, and the like. In other examples, the secure tunnel service 168 executes using computing resources located outside of a cloud-based environment.

In some examples, the secure tunnel service 168 performs authentication operations with other components (e.g., the IT and security operations application 100 and an on-premises proxy 130 or on-premises action execution agent 144) to establish trust and then establishes secure communications channels with those components, where the secure tunnel service 168 and other components transmit secure communications using the secure communications channels. In some examples, the secure tunnel service 168 provides end-to-end encryption (E2EE) of communications between the IT and security operations application 100 and an on-premises action execution agent 144 via an on-premises proxy 130 by transmitting one or more encrypted data packets between the IT and security operations application 100 and the on-premises proxy 130. In some examples, communications sent through the secure tunnel service 168 are in the form of data packets, where each data packet includes, for example, a payload and a device identifier for a destination device that is to receive the data packet. In other examples, the data packet can also include a device identifier for the source device or an instance identifier that indicates an IT and security operations application instance associated with the data packet. In some examples, the data packet is encrypted prior to being transmitted to the secure tunnel service 168, e.g., using a public key of an asymmetric key pair generated by a receiving device. While in some examples, the secure tunnel service 168 decrypts the data packet before sending the data packet to its intended destination, in other examples, the secure tunnel service 168 forwards the encrypted data packet to its intended destination without performing a decryption process.

In some examples, the IT and security operations application 100 and on-premises proxy 130 communicates with the secure tunnel service 168 across network(s) 112. As indicated herein, the networks 112 can be communications networks, such as a local area network (LAN), wide area network (WAN), cellular network (e.g., LTE, HSPA, 3G, 4G, and/or any other network based on cellular technologies), and/or networks using any of wired, wireless, terrestrial microwave, or satellite links. In some examples, after an on-premises action execution agent 144 is installed and executed within a tenant network 110A, the on-premises action execution agent 144 uses an on-premises proxy 130 to initiate a process to establish a secure connection (e.g., a gRPC Remote Procedure Calls (gRPC) over HTTP/2 connection) with a secure tunnel service 168. For example, the secure tunnel service 168 may establish the secure connection and associate the secure connection with a device identifier for the on-premises proxy 130.

In some examples, the secure tunnel service 168 maintains a database that stores document data structures and optionally stores keys. This database, for example, can be a structure query language (SQL) database, or a NoSQL database, such as an AMAZON® DynamoDB. In some examples, the database includes a key store that stores encryption keys, including single-use session keys and long-term keys associated with devices that send E2EE communications. In other examples, the secure tunnel service 168 does not store encryption keys and routes messages without the use of a key store. In some examples, the database also includes a routing table that includes address information associated with devices registered with the secure tunnel service 168 with which the service has established secure communications. The secure tunnel service 168, for example, can send queries to the database to determine, based on a device identifier in a particular data packet, the address of the intended recipient of the particular data packet.

As illustrated in FIG. 1, the secure tunnel service 168 may not directly communicate with an on-premises action execution agent 144 but communicate instead through an on-premises proxy 130. As indicated herein, the on-premises proxy 130 is a process executing in the tenant network 110A and that operates as a gateway between the secure tunnel service 168 and the IT and security operations application 100. The on-premises proxy 130 is configured to receive messages from the secure tunnel service 168 and forward the messages to the on-premises action execution agent 144 for processing. The on-premises proxy 130 can also be configured to generate and send messages (e.g., notifications, alerts, etc.) IT and security operations application 100 via the secure tunnel service 168. In some examples, the on-premises proxy 130 can also send messages to configured mobile devices in accordance with a push notification service, such as the APPLE® Push Notification service (APN), or GOOGLE® Cloud Messaging (GCM). In some examples, the on-premises proxy 130 is configured to perform the management, generation, and registration of encryption keys used to communicate with the secure tunnel service 168.

As previously indicated, an IT and security operations application 100 can enable users to create custom apps 146, where such apps can add connectivity to third party technologies and devices (e.g., including technologies implementing various types of computing resources 132 within a tenant network) through the implementation of custom actions. According to examples described herein, an IT and security operations application 100 more specifically includes a built-in app editor 158 enabling users to create, modify, and test apps within the app editor, thereby allowing users to readily extend the IT and security operations application 100 as desired.

In some examples, a user can initiate the process of creating a new app by accessing an "Apps" section within the IT and security operations application 100. For example, a user can use a client device 106 to navigate to a webpage or other interface of the IT and security operations application 100 to a section including an apps listing interface. In some examples, an apps listing interface enables users to view, install, and configure apps within their IT and security operations application 100 instance. In some examples, an apps listing interface further enables users to create new apps and to modify the implementation of existing apps, if desired, and assuming a user has sufficient permissions to modify a particular app.

Figure 2:
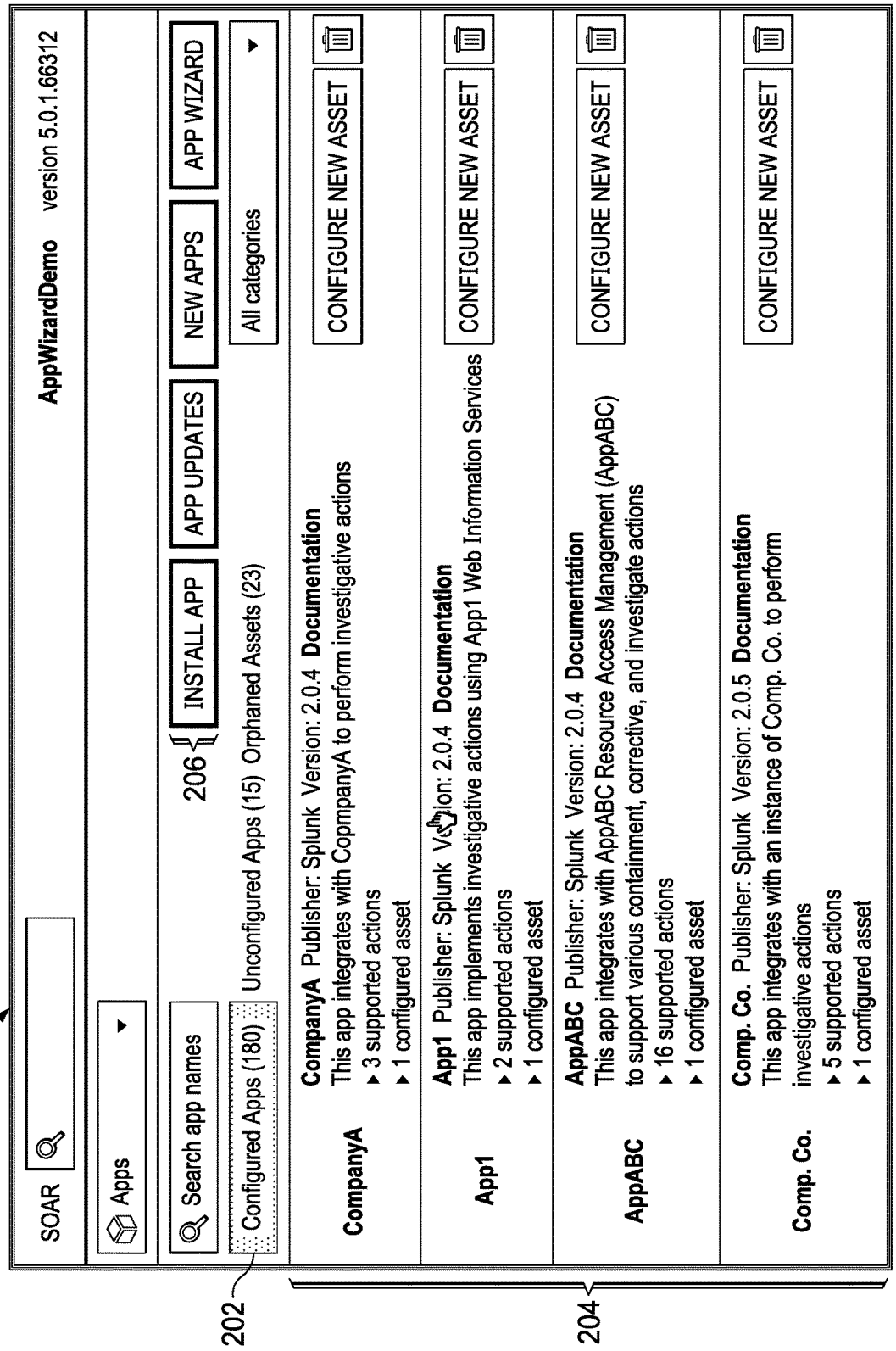
FIG. 2 illustrates an example app listing interface provided by an IT and security operations application according to some examples.

For example, FIG. 2 illustrates an example apps listing interface 200 of an IT and security operations application according to some examples. As shown, the apps listing interface 200 includes interface elements 202 enabling users to view previously configured apps, view unconfigured apps, among viewing other types of apps-related information. The example apps listing interface 200 includes an app list 204 showing relevant apps based on the user's selection of a type of app of interest. The example apps listing interface 200 shown in FIG. 2 further includes interface elements 206 enabling a user to provide input indicating that the user desires to install a new app, to discover updates to existing apps, or to create a new app (e.g., optionally beginning with an "app wizard").

Figure 3:
FIG. 3 illustrates an example interface showing a list of draft apps currently under development by one or more users of the IT and security operations application according to some examples.

As indicated, if a user has previously started the process of creating or modifying a custom app, a user can request to view these "draft" apps. FIG. 3 illustrates an example interface displaying a list of draft apps currently under development by a user of the IT and security operations application according to some examples. As shown, the draft apps interface 300 includes an interface element 302 that, upon selection, causes display of a list of draft apps. In this example, the interface 300 displays a single draft app 304 including information about the app such as the app's name, a version of the app, and a number of actions supported by the app. In some examples, the interface further includes interface elements 306 that enable a user to perform different actions relative to the app including, for example, further editing the app, viewing source code and configuration data associated with the app, cloning the app, deleting the app, etc.

Figure 4:
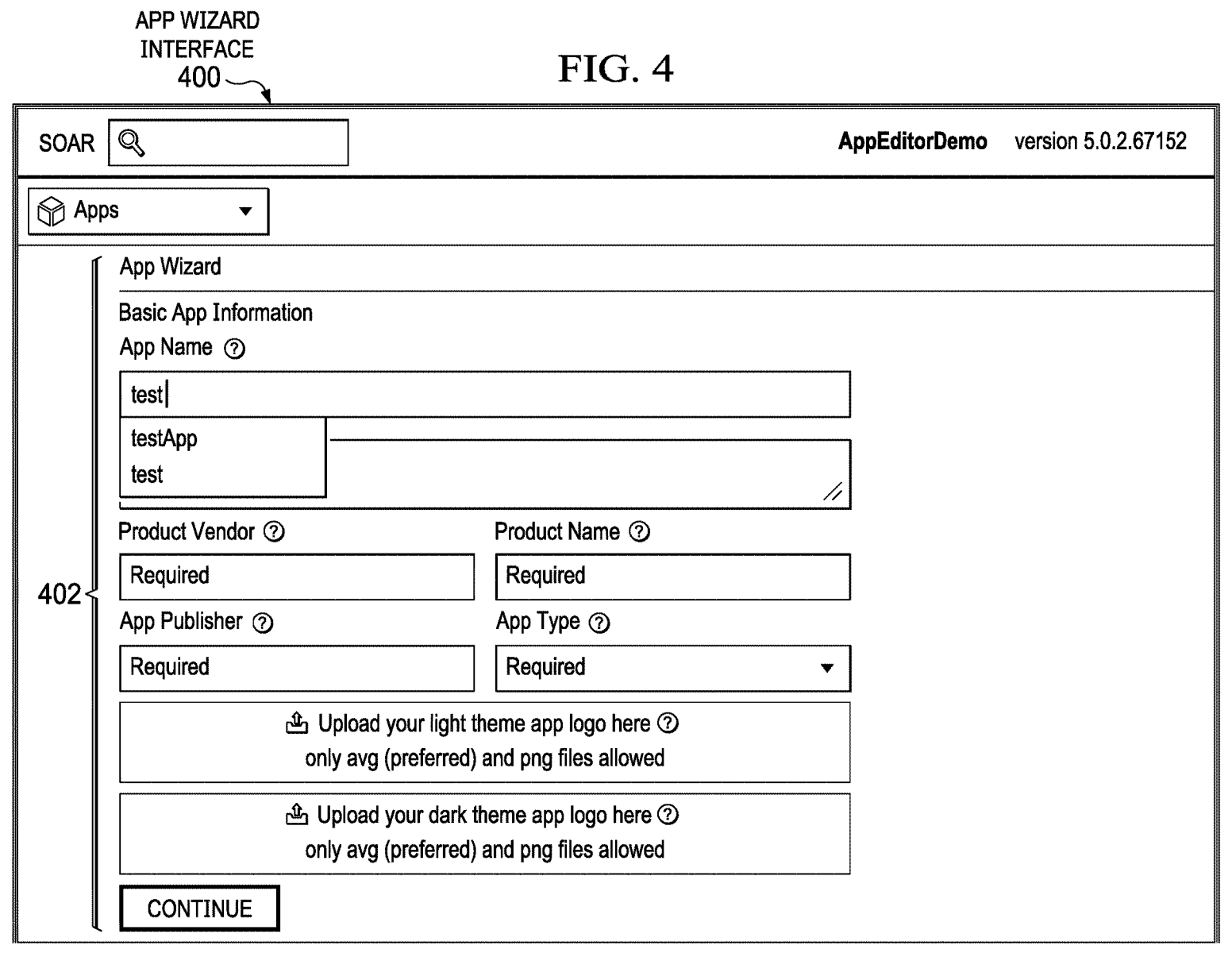

In some examples, a user desiring to create a new app can begin with an "app wizard" interface used to enter basic app information and to broadly define characteristics of the app. FIG. 4 illustrates an example app wizard interface according to some examples. As indicated above, a user can access the app wizard interface via the apps listing page or from another interface of the IT and security operations application 100. As shown, the app wizard interface 400 includes text fields and other interface elements 402 that enable users to provide information such as, for example, an app name, an app description, a product vendor, a product name, an app publisher, an app type, and an app logo. In some examples, the IT and security operations application 100 uses the information provided by a user in the app wizard interface 400 to generate an app template for the user, where the app template can include template configuration file(s) and a source code skeleton for the app.

Figure 5:
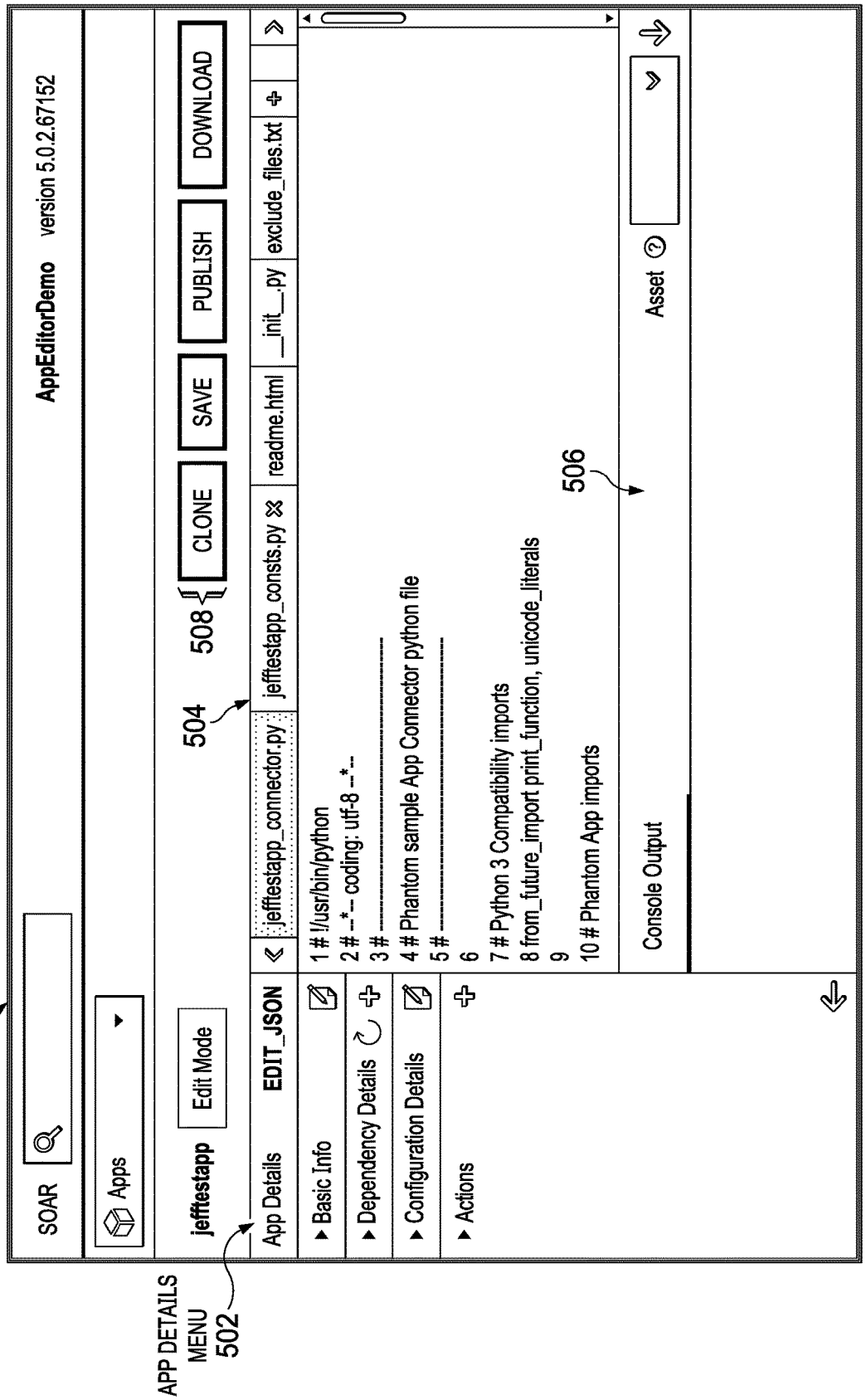
FIG. 5 illustrates an example app editor interface for an IT and security operations application according to some examples.

Once a user completes the app wizard setup or otherwise requests to create a new app, in some examples, the user is provided with an app editor interface enabling the user to create and test actions to be implemented as part of the app under development. FIG. 5 illustrates an example app editor interface for an IT and security operations application according to some examples. As shown, an app editor interface 500 includes an app details menu 502, a source code text editor 504, a console output window 506, and interface elements 508 enabling users to request various types of app development actions e.g., to clone the app, save the app, publish the app, or download the app.

For example, using the interface elements 508, a request to clone an app can result in the IT and security operations application 100 creating a separate copy of the associated source code and configuration files, such that the user can modify the app implementation without affecting the original version of the app. A user can request to save an app under development to cause the IT and security operations to store a copy of the app components, including any updates made the components in the app editor, to a data store or version control system managed by the IT and security operations application 100. In some examples, a request to publish an app causes the IT and security operations application 100 to make the app available to associated users of the application (e.g., by including the app in users' app listing page, where the app can then be installed into users' IT and security operations application instances). In some examples, a request to download an app causes the IT and security operations application 100 to provide a downloadable copy of the app components (e.g., source code and configuration files) for use in a user's own local environment.

In some examples, the source code text editor 504 enables user to view and edit the source code and configuration files that comprise the app under development in the editor. As indicated above, some portion of the source code and configuration files can initially be generated by the IT and security operations application 100 automatically, e.g., in a "skeleton" form based on the input provided by a user in an app wizard or other interface. A user can then use the editor to fill in templated portions of the skeleton code and configuration information to implement the particular actions desired by the user. For example, a source code text editor 504 broadly enables users to provide program code as input. In some examples, the source code text editor 504 provides various source code editing functionality such as, e.g., syntax highlighting, indentation, autocomplete, and brace matching functionality. As indicated, users can also use the source code text editor 504 to edit configuration files associated with an app (e.g., configuration files formatted using JavaScript Object Notation (JSON) or other data formats).

In some examples, the app details menu 502 includes information and metadata about the app under development in the editor including, e.g., basic information such as an app name, app description, product vendor, app publisher, etc.; dependency details (e.g., identifying additional Python modules or other types of library dependencies); app configuration details (e.g., used to specify certain parameters for the app that may change over time and for which it may be undesirable to hardcode a value); and information about actions defined by the app.

Figure 6:
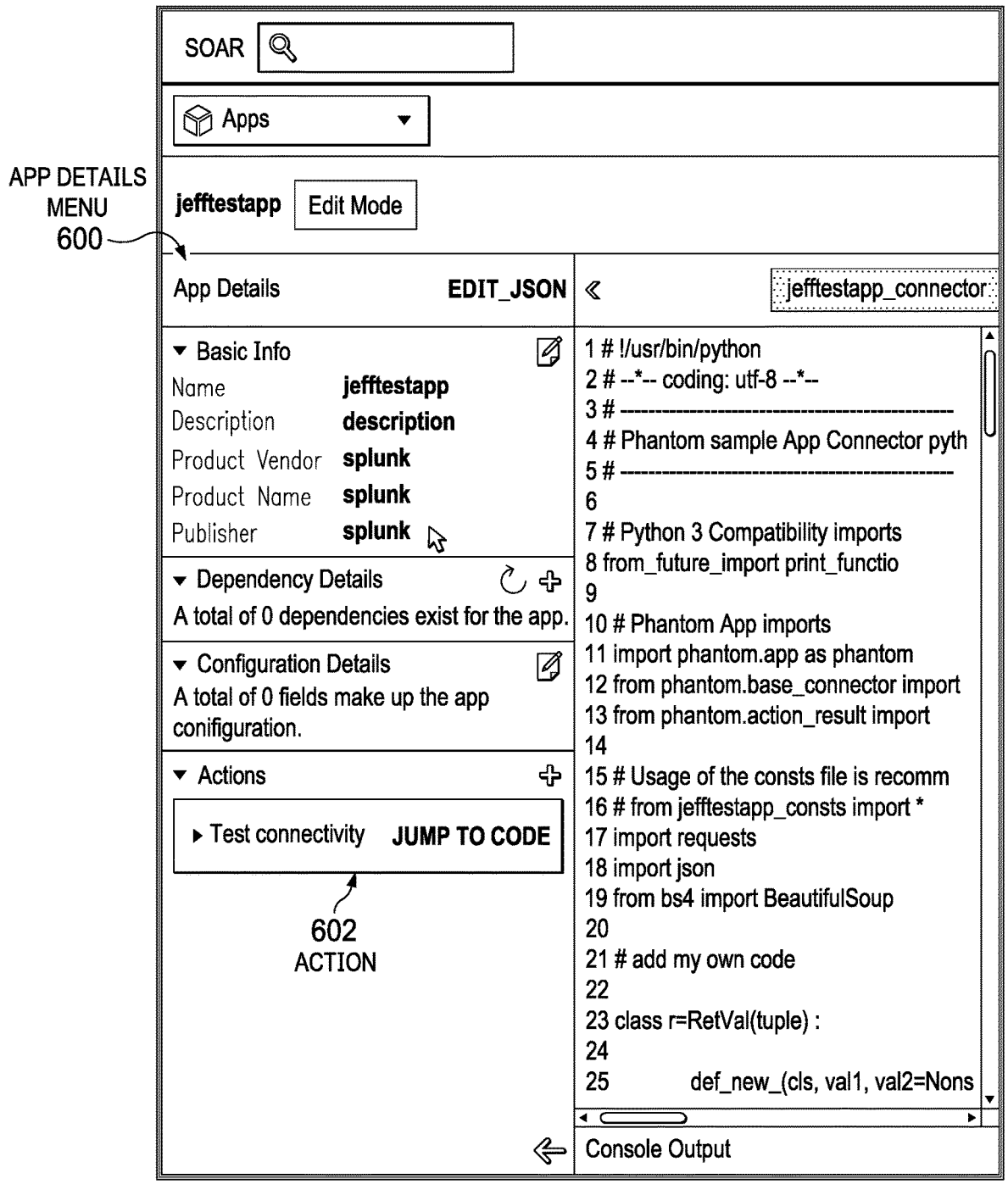
FIG. 6 illustrates an example app details menu of an app editor interface according to some examples.

FIG. 6 illustrates an example app details menu of an app editor interface according to some examples. In FIG. 6, the various sections of the app details menu 600 are shown in expanded form. As indicated above, a basic information section provides information about the app under development, a dependency details section provides information about any app dependencies, and a configuration details section provides information about any configured app parameters. In this example, the app details menu 600 further shows an action 602 identified in the actions information section (e.g., an action named "test connectivity"). In some examples, the data populating the app details menu is derived in part from an analysis by the IT and security operations application 100 of the app source code and configuration files (e.g., the IT and security operations application 100 can identify basic information about the app from a configuration file, dependency details and app actions by analyzing the app source code, and so forth).

As indicated, a user can generally add any custom action to an app depending on the type of functionality desired by the user. In some examples, an IT and security operations application 100 can provide one or more recommended actions for an app based on a category indicated for the app. For example, if a user indicates that an app is associated with an "information" category (e.g., indicating that the app is intended to obtain additional information about a resource or artifact from an external service), the IT and security operations application might recommend a "geolocate ip" action as an action option. If this recommended action is relevant to the user, the user can select the recommended action and provide additional information used to carry out the geolocation of an IP address from a particular service (e.g., by specifying a representational state transfer (REST) endpoint associated with a service from which information is to be obtained). In other examples, users can create entirely custom actions that are not based on any particular action template provided by the IT and security operations application 100.

Figure 7:
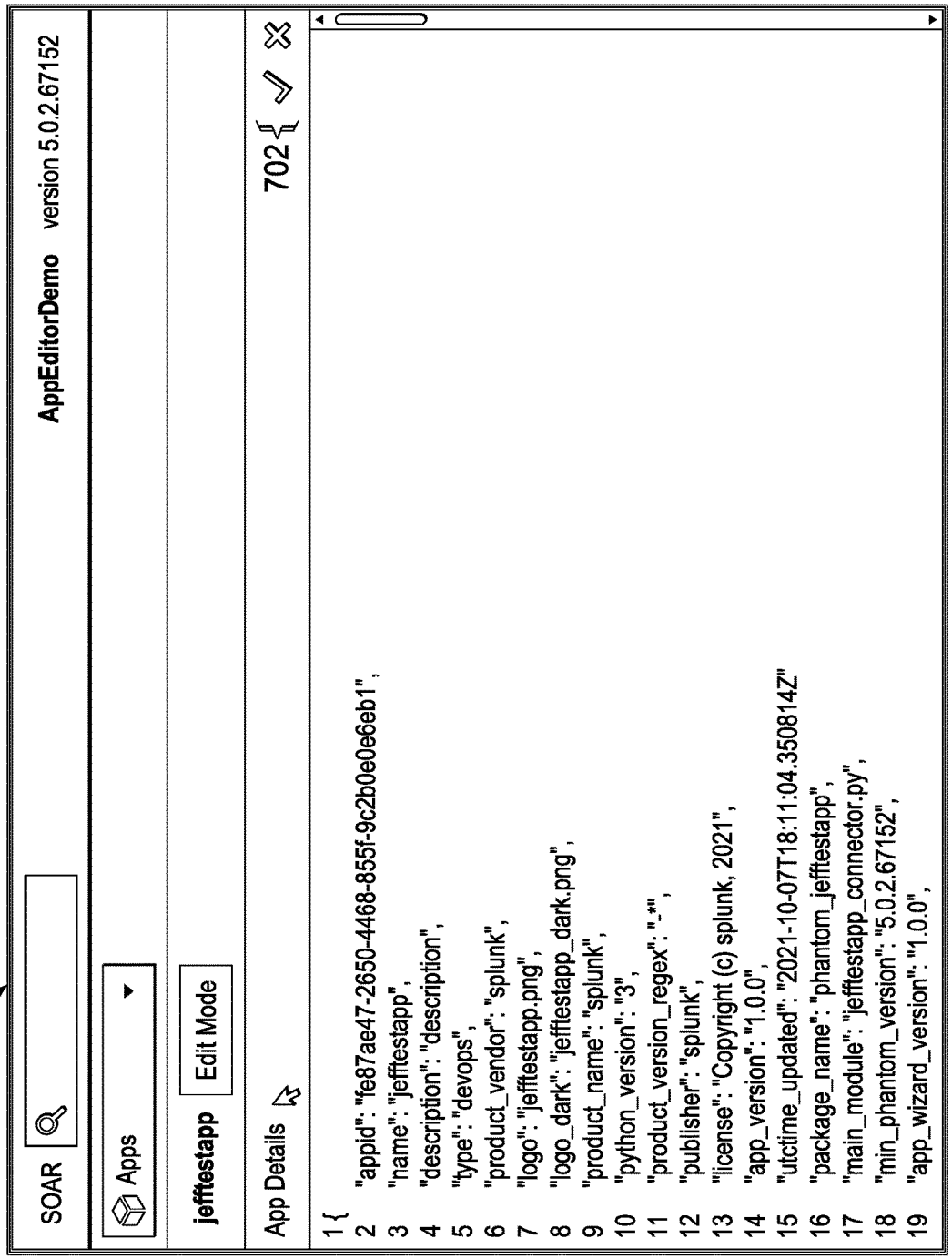
FIG. 7 illustrates an example app configuration editor including an app configuration validator according to some examples.

In some examples, users can also use the app editor to edit configuration information. FIG. 7 illustrates an app configuration editor interface including an app configuration validator according to some examples. In FIG. 7, the app configuration editor interface 700 enables users to view and modify one or more configuration files associated with the app under development. In some examples, the configuration information includes key-value pairs or other structured or semi-structured data indicating information about the app such as, e.g., an app identifier, app name, app description, app packages, app modules, and the like. In some examples, the app editor includes the ability to validate the syntax and optionally the content of the configuration information (e.g., using the validation interface elements 702), e.g., to ensure that the configuration is formatted in a manner expected by the app logic.

Figure 8:
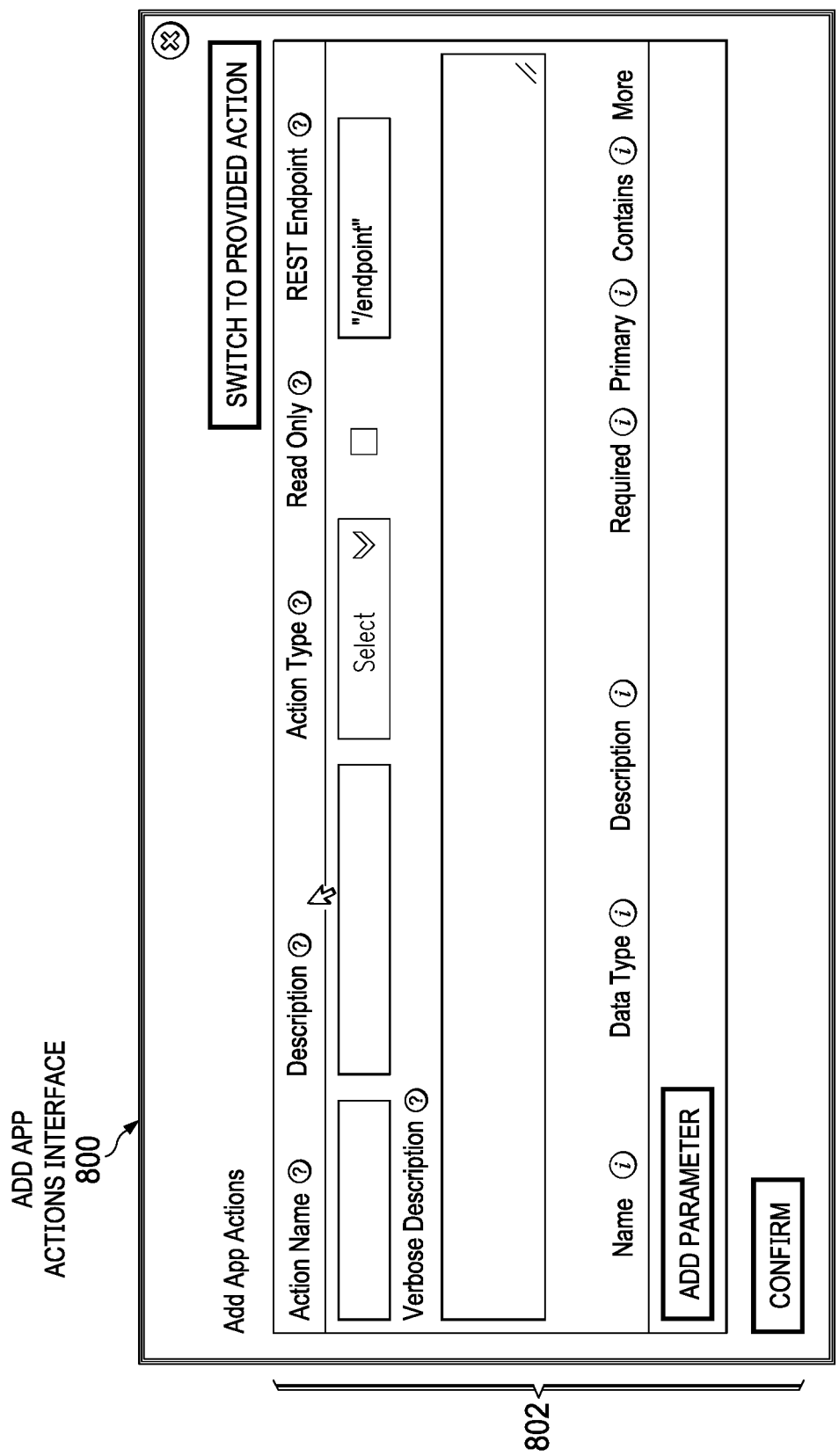
FIG. 8 illustrates an example app action creation interface according to some examples.

In some examples, users can also use the app editor to edit configuration information. FIG. 8 illustrates an example app action creation interface according to some examples. In FIG. 8, an add app actions interface 800 is shown including interface elements 802 enabling a user to define aspects of an action to be added to the app under development including, e.g., a name for the action, a description of the action, a type of the action, a REST endpoint relevant to the action, and other parameters to the action. In some examples, based on the input provided by a user in an add app actions interface 800, the IT and security operations application can automatically generate and add source code and configuration information to the user's app, where the user can then fill in any additional source code used to fully implement the desired action. In general, a user can add any number of separate actions to an app using the app editor.

In some examples, users can also use the app editor to identify computing resources, or "assets," against which an action can be executed (e.g., for testing an action). In this context, a computing resource broadly represents any physical or virtual device within a user's organization such as a server, endpoint, router, firewall, or service. A user configures a computing resource by providing information that enables the app to interact with the asset (e.g., including a password, security token, network address, or the like). In some examples, the app editor provides an interface for adding a new asset, including interface elements enabling a user to specify asset information (e.g., an asset name, asset description, product vendor, product name, tags, etc.), asset credentials, etc. Once configured, the IT and security operations application 100 saves the asset information as part of the app configuration and, as described in more detail hereinafter, a user can request execution of actions against configured assets. In some examples, an app editor further includes interfaces enabling users to add app dependencies (e.g., to import and identify app dependency packages).

Figure 9:
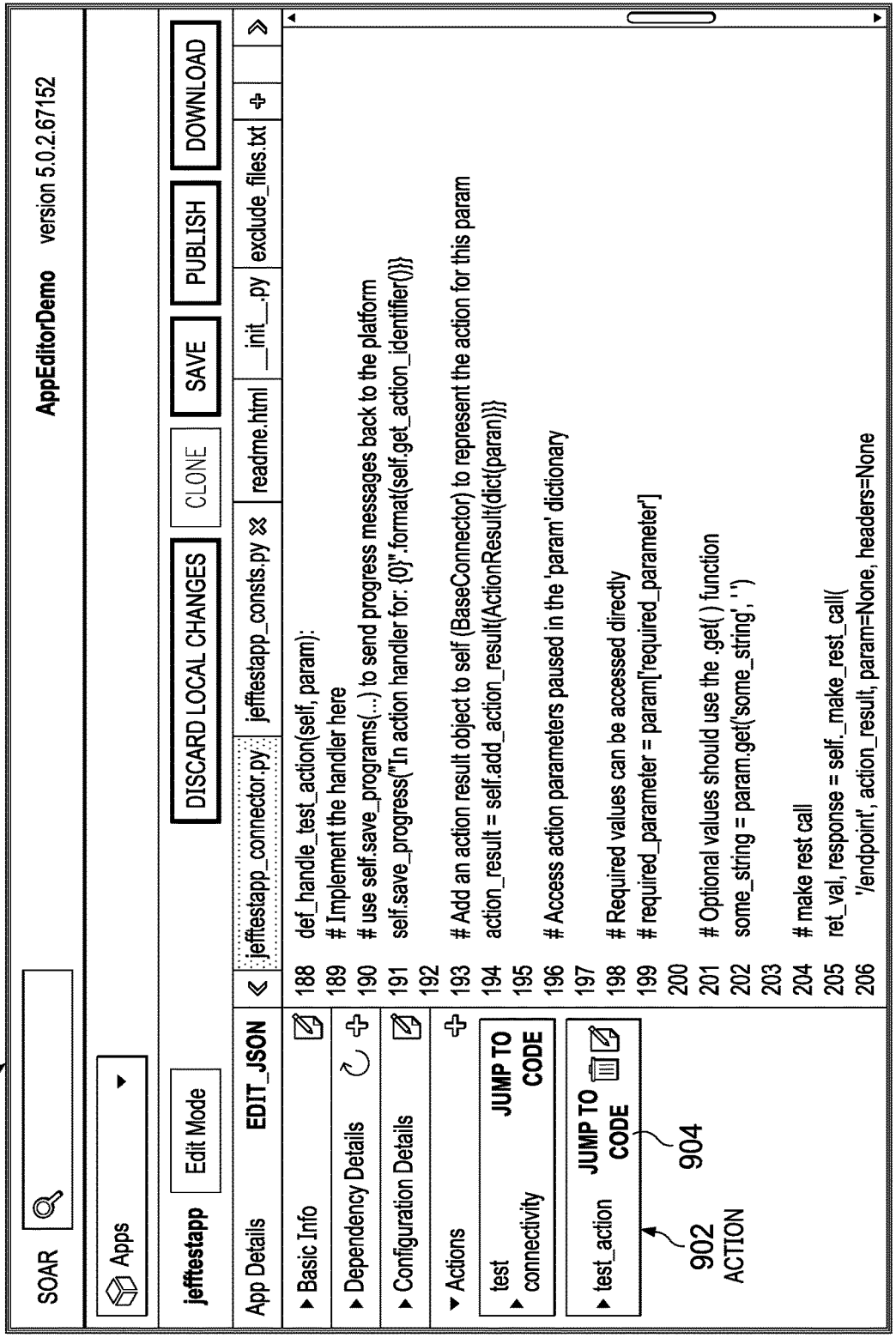
FIG. 9 illustrates an example action section of the app editor navigation menu responsive to the addition of an app action according to some examples.

FIG. 9 illustrates an example action section of the app editor navigation menu responsive to the addition of an app action according to some examples. As shown, the app editor interface 900 includes a newly added action 902 named "test_action" in the actions section of the app details menu. In some examples, once a user creates an app action, the user can request for the IT and security operations application 100 to "jump" to the code path where the action is defined. As indicated above, the app editor includes an Actions section as part of the app editor's navigation menu that displays a list of defined actions. As shown in FIG. 9, the interface includes a jump to code interface element 904 associated with each of the displayed actions. In some examples, responsive to selection of a jump to code interface element, the app editor locates the portion of source code associated with the action (e.g., based on locating a function in the source code associated with the action name) and causes the portion of source code to be displayed in the source code text editor for the user. In some examples, the ability for the app editor interface to inject template code, to jump to particular code sections, and perform other operations is implemented at least in part using an abstract syntax tree parser to navigate the structure of the app source code.

Once a user has created an action and optionally added one or more computing resources, the user can test the app action within the app editor. As indicated, in some examples, the app editor includes an "actions" section as part of the app editor's navigation menu including a list of actions added to the app's source code. In the actions section, a user can select an action that the user desires to test and provide any inputs to be used by the action. The user can also optionally select an asset, or computing resource, against which the action is to be tested.

Figure 10:
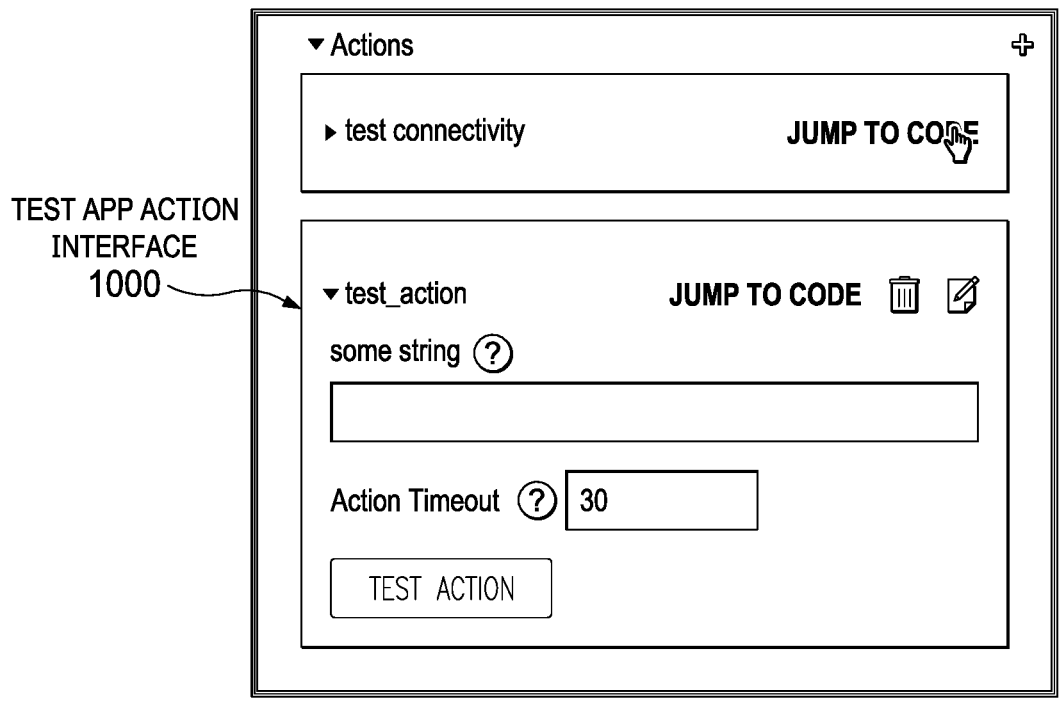
FIG. 10 illustrates an example of using an app editor interface to test execution of an app action under development within the app editor according to some examples.

FIG. 10 illustrates an example of using an app editor interface to test execution of an app action under development within the app editor according to some examples. In FIG. 10, a test app action interface 1000 is shown, e.g., as part the actions section of an app details menu within the app editor. As shown, the test app action interface 1000 includes interface elements that enable a user to provide input values for any specified parameters to the action and an action timeout value (e.g., to indicate how long the action is to execute before timing out). In some examples, a user can also provide input to the app editor interface indicating an asset against which the action is to be tested. In some examples, a request to test the action with any provided input causes the IT and security operations application 100 to execute the executable source code of the selected action within an execution environment managed by the IT and security operations application.

Figure 11:
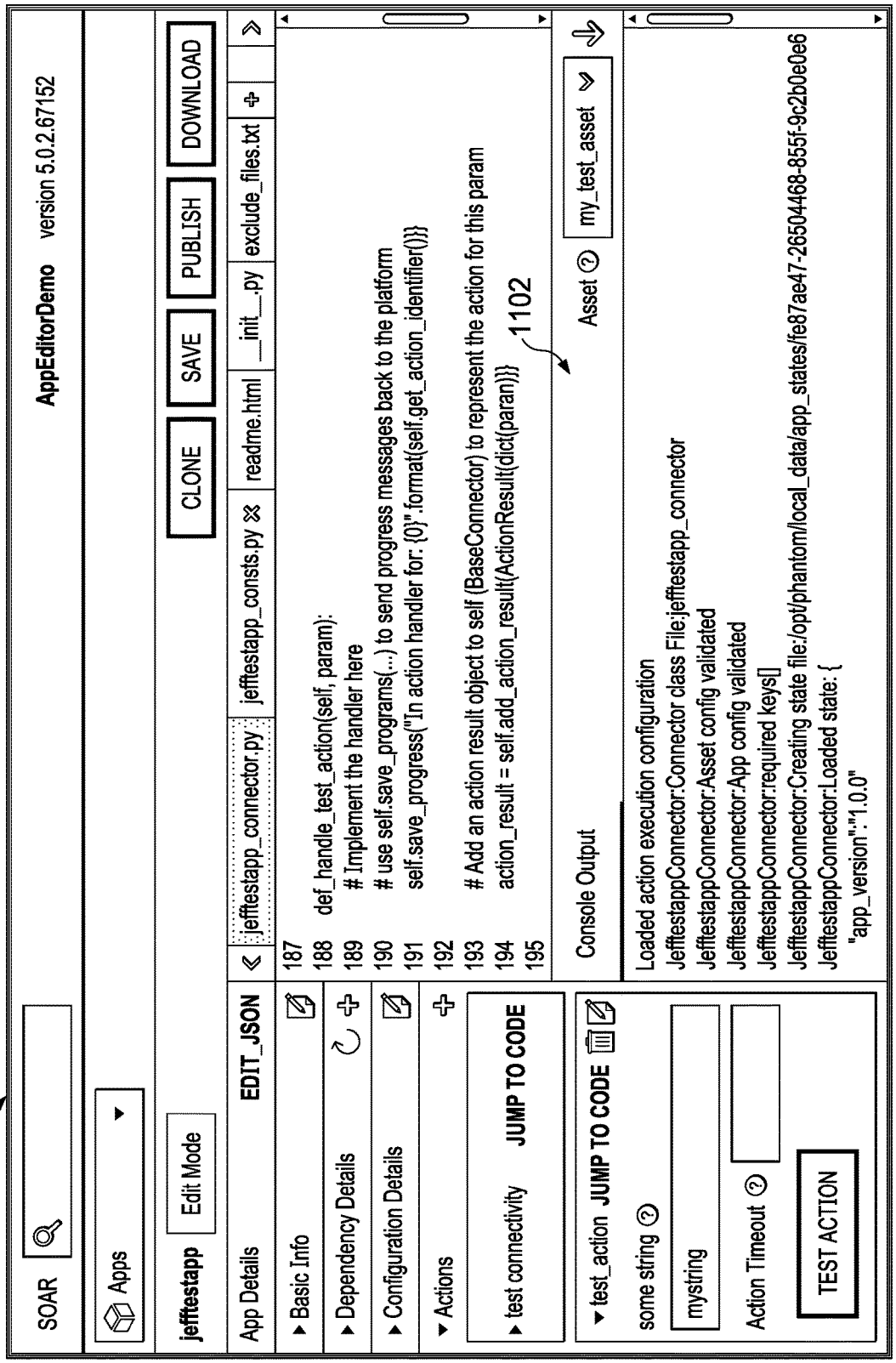
FIG. 11 illustrates the display of console output describing execution of the action in an app editor interface according to some examples.

In some examples, based on the execution of an action within the app editor, the app editor displays results from the action execution in a "Console Output" interface element. The user can review the console output to confirm whether the action execution was successful or, in the case of an unsuccessful execution or unexpected operation of the action, obtain information indicating why the action execution failed or provided unexpected output. FIG. 11 illustrates the display of console output describing execution of an action in an app editor interface 1100 according to some examples. In FIG. 11, a user has used the actions section of the app editor navigation menu to test the action named "test_action," e.g., by providing the identified input parameters and selecting the "Test Action" interface element. In some examples, responsive to this input, the IT and security operations application 100 executes the test action (e.g., by causing an execution environment to execute the program code implementing the action) and obtains any output from the execution (e.g., including debug information, text output generated by the action, etc.). The IT and security operations application 100 further causes the output of the action execution to be displayed in a console output panel 1102. In this manner, a developer of the app can test the performance of the app's actions directly in the app editor development environment and prior installing or publishing the app for general use. In some examples, users can test app actions against assets located within a user's remote computing environment, e.g., wherein the IT and security operations application 100 sends a request to execute the action to an on-premises action execution agent via an on-premises proxy, as illustrated in FIG. 1.

In some examples, once an app under development is modified, the app editor assigns a "Draft" status to the application and further optionally assigns the app an associated version number. In general, an app in draft status represents an app that is under development and not yet ready for general use. The user can continue to modify a draft app until the user is satisfied with its functionality. In some examples, the app editor restricts the ability to modify draft apps to only a user account that originally created an app or to only user accounts assigned privileges to modify an app. In other examples, the app editor generally enables any user account with permissions to develop apps to modify apps in draft status. The app editor can also enable user accounts with sufficient privileges to view app implementations without the ability to modify the apps (e.g., in a read-only mode), such that users can observe how an app is implemented and use app source code and configuration in other apps, if desired.

In some examples, the IT and security operations application 100 can cause saved copies of an app under development to be stored in a version control system, thereby enabling users optionally to branch or fork a current version of app, to revert changes to an app to an earlier version, among other operations generally supported by version control systems. In other examples, the components of an app can be stored in other types of data stores such as a database or standard file system. Once a user is satisfied with the condition of a draft app, the user can use the app editor to "publish" the app, which causes the app to be made available to any users with sufficient permissions to install the app. Users can then install the published app into their IT and security operations application environment as desired (e.g., such that the users can execute the app's actions in playbooks and as part of other IT and security operations application 100 functionality).

Figure 12:
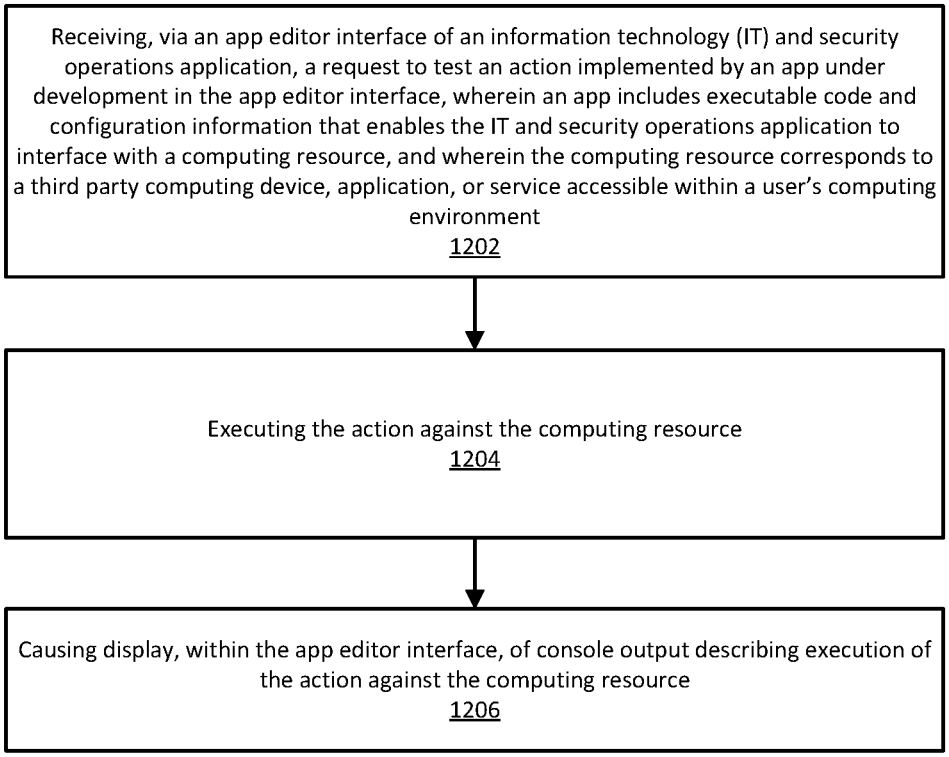
FIG. 12 is a flow diagram illustrating operations of a method for providing a built-in app editor that enables users to create, modify, and test apps within an IT and security operations application according to some examples.

FIG. 12 is a flowchart illustrating an example process 1200 for providing a built-in app editor that enables users to create, modify, and test apps within an IT and security operations application. The example process 1200 can be implemented, for example, by a computing device that comprises a processor and a non-transitory computer-readable medium. The non-transitory computer readable medium can be storing instructions that, when executed by the processor, can cause the processor to perform the operations of the illustrated process 1200. Alternatively or additionally, the process 1200 can be implemented using a non-transitory computer-readable medium storing instructions that, when executed by one or more processors, case the one or more processors to perform the operations of the process 1200 of FIG. 12.

The process 1200 includes, at block 1202, receiving, via an app editor interface of an information technology (IT) and security operations application, a request to test an action implemented by an app under development in the app editor interface, wherein an app includes executable code and configuration information that enables the IT and security operations application to interface with a computing resource, and wherein the computing resource corresponds to a third party computing device, application, or service accessible within a user's computing environment.

The process 1200 further includes, at block 1204, executing the action against the computing resource.

The process 1200 further includes, at block 1206, causing display, within the app editor interface, of console output describing execution of the action against the computing resource.

In some examples, the process further includes assigning a draft status to the app under development in the app editor interface, wherein apps assigned the draft status are accessible to only a user developing the app; receiving input requesting to publish the app; and assigning a published status to the app, wherein apps assigned the published status are accessible to users with permissions to install published apps.

In some examples, the process further includes receiving, via the app editor interface, input selecting an action associated with the app; and causing display within the app editor interface of source code implementing the action.

In some examples, the process further includes receiving input requesting to save the app; and committing the executable code and configuration information of the app to a version control system.

In some examples, the IT and security operations application executes in a first computing environment, wherein the computing resource is located in a second computing environment that is external to the first computing environment, and wherein the IT and security operations application executes the action against the computing resource via an automation broker running in the second computing environment.

In some examples, the process further includes receiving, via an app wizard interface, input indicating information about the app, wherein the information about the app includes a name of the app and a description of the app's functionality; generating a template for the app based on the input, wherein the template for the app includes template source code and template configuration data; and causing display of the template source code in the app editor interface.

In some examples, the process further includes receiving, via the app editor interface, input to modify at least a portion of the executable source code; and receiving, via the app editor interface, input to modify at least a portion of the configuration information.

In some examples, the process further includes causing display of a navigation menu within the app editor interface, wherein the navigation menu displays information about actions included in the app, and wherein the information about actions included in the app is generated based on an analysis of the executable source code of the app.

In some examples, the process further includes receiving input requesting to save the app under development in the app editor interface; assigning a version number to the app; and storing a copy of the app in association with the version number.

In some examples, the process further includes validating a format of the configuration information; and causing display of output from the validating in the app editor interface.

In some examples, the process further includes causing display of an app action wizard interface including interface elements used to define a new action to be added to the app, wherein the interface elements include a first interface element used to specify a name of the action and a second interface element used to specify a parameter of the action; receiving, via the app action wizard interface, input defining a new action; and adding, by the IT and security operations application, source code to the app for the new action based on the input.

In some examples, wherein the request to test the action includes input specifying a parameter value for the action, and wherein executing the action against the computing resource is based in part on the parameter value.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center: a centralized location where computing resources are kept and maintained, and whose resources are accessible over a network. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. In both of these examples, users may expect resources to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and information about the computing environment can aid the entity in understanding whether the computing environment is serving its purpose well.

A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 13:
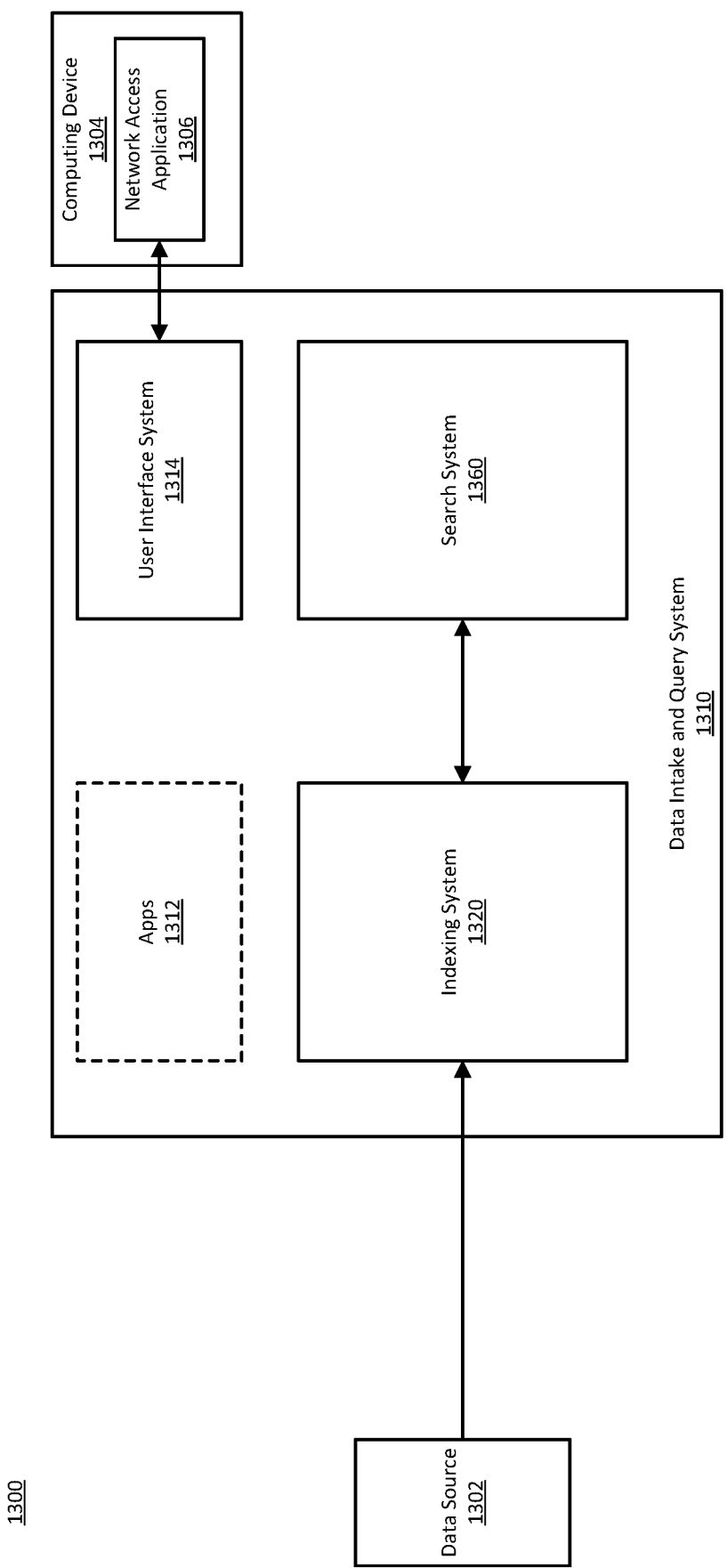
FIG. 13 is a block diagram illustrating an example computing environment 1300 that includes a data intake and query system according to some examples.

FIG. 13 is a block diagram illustrating an example computing environment 1300 that includes a data intake and query system 1310. The data intake and query system 1310 obtains data from a data source 1302 in the computing environment 1300 and ingests the data using an indexing system 1320. A search system 1360 of the data intake and query system 1310 enables users to navigate the indexed data. Though drawn with separate boxes, in some implementations the indexing system 1320 and the search system 1360 can have overlapping components. A computing device 1304, running a network access application 1306, can communicate with the data intake and query system 1310 through a user interface system 1314 of the data intake and query system 1310. Using the computing device 1304, a user can perform various operations with respect to the data intake and query system 1310, such as administration of the data intake and query system 1310, management and generation of "knowledge objects," initiating of searches, and generation of reports, among other operations. The data intake and query system 1310 can further optionally include apps 1312 that extend the search, analytics, and/or visualization capabilities of the data intake and query system 1310.

The data intake and query system 1310 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 1310 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 1310 can execute on a single computing device, or may be distributed over multiple computing devices. For example, the program code can include instructions for executing both indexing and search components (which may be part of the indexing system 1320 and/or the search system 1360, respectively), and can be executed on a computing device that also provides the data source 1302. As another example, the program code can execute on one computing device, where the program code executes both indexing and search components, while another copy of the program code executes on a second computing device that provides the data source 1302. As another example, the program code can execute only an indexing component or only a search component. In this example, a first instance of the program code that is executing the indexing component and a second instance of the program code that is executing the search component can be executing on the same computing device or on different computing devices.

The data source 1302 of the computing environment 1300 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 1302 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 1320 obtains machine data from the data source 1302 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 1320 does not require prior knowledge of the structure of incoming data (e.g., the indexing system 1320 does not need to be provided with a schema describing the data). Additionally, the indexing system 1320 retains a copy of the data as it was received by the indexing system 1320 such that the original data is always available for searching (e.g., no data is discarded, though, in some examples, the indexing system 1320 can be configured to do so).

The search system 1360 searches the data stored by the indexing system 1320. As discussed in greater detail below, the search system 1360 enables users associated with the computing environment 1300 (and possibly also other users) to navigate the data, generate reports, and visualize results in "dashboards" output using a graphical interface. Using the facilities of the search system 1360, users can obtain insights about the data, such as retrieving events from an index, calculating metrics, searching for specific conditions within a rolling time window, identifying patterns in the data, and predicting future trends, among other examples. To achieve greater efficiency, the search system 1360 can apply map-reduce methods to parallelize searching of large volumes of data. Additionally, because the original data is available, the search system 1360 can apply a schema to the data at search time. This allows different structures to be applied to the same data, or for the structure to be modified if or when the content of the data changes. Application of a schema at search time may be referred to herein as a late-binding schema technique.

The user interface system 1314 provides mechanisms through which users associated with the computing environment 1300 (and possibly others) can interact with the data intake and query system 1310. These interactions can include configuration, administration, and management of the indexing system 1320, initiation and/or scheduling of queries to the search system 1360, receipt or reporting of search results, and/or visualization of search results. The user interface system 1314 can include, for example, facilities to provide a command line interface or a web-based interface.

Users can access the user interface system 1314 using a computing device 1304 that communicates with data intake and query system 1310, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 1300. For example, a person can log in as a particular user and, using the user's digital information, can access the data intake and query system 1310. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 1304 can provide a human-machine interface through which a person can have a digital presence in the computing environment 1300 in the form of a user. The computing device 1304 is an electronic device having one or more processors and a memory capable of storing instructions for execution by the one or more processors. The computing device 1304 can further include input/output (I/O) hardware and a network interface. Applications executed by the computing device 1304 can include a network access application 1306, which can a network interface of the client computing device 1304 to communicate, over a network, with the user interface system 1314 of the data intake and query system 1310. The user interface system 1314 can use the network access application 1306 to generate user interfaces that enable a user to interact with the data intake and query system 1310. A web browser is one example of a network access application. A shell tool can also be used as a network access application. In some examples, the data intake and query system 1310 is an application executing on the computing device 1304. In such examples, the network access application 1306 can access the user interface system 1314 without needed to go over a network.

The data intake and query system 1310 can optionally include apps 1312. An app of the data intake and query system 1310 is a collection of configurations, knowledge objects (a user-defined entity that enriches the data in the data intake and query system 1310), views, and dashboards that may provide additional functionality, different techniques for searching the data, and/or additional insights into the data. The data intake and query system 1310 can execute multiple applications simultaneously. Example applications include an information technology service intelligence application, which can monitor and analyze the performance and behavior of the computing environment 1300, and an enterprise security application, which can include content and searches to assist security analysts in diagnosing and acting on anomalous or malicious behavior in the computing environment 1300.

Though FIG. 13 illustrates only one data source, in practical implementations, the computing environment 1300 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 1300, the data intake and query system 1310 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud and has digital access to resources provided by the computing devices only to the extent that such access is enabled by the provider entity.

In some implementations, the computing environment 1300 can include on-prem and cloud-based computing resources, or only cloud-based resources. For example, an entity may have on-prem computing devices and a private cloud. In this example, the entity operates the data intake and query system 1310 and can choose to execute the data intake and query system 1310 on an on-prem computing device or in the cloud. In another example, a provider entity operates the data intake and query system 1310 in a public cloud and provides the functionality of the data intake and query system 1310 as a service, for example under a Software-as-a-Service (SaaS) model. In this example, the provider entity can provision a separate tenant (or possibly multiple tenants) in the public cloud network for each subscriber entity, where each tenant executes a separate and distinct instance of the data intake and query system 1310. In some implementations, the entity providing the data intake and query system 1310 is itself subscribing to the cloud services of a cloud service provider. As an example, a first entity provides computing resources under a public cloud service model, a second entity subscribes to the cloud services of the first provider entity and uses the cloud computing resources to operate the data intake and query system 1310, and a third entity can subscribe to the services of the second provider entity in order to use the functionality of the data intake and query system 1310. In this example, the data sources are associated with the third entity, users accessing the data intake and query system 1310 are associated with the third entity, and the analytics and insights provided by the data intake and query system 1310 are for purposes of the third entity's operations.

Figure 14:
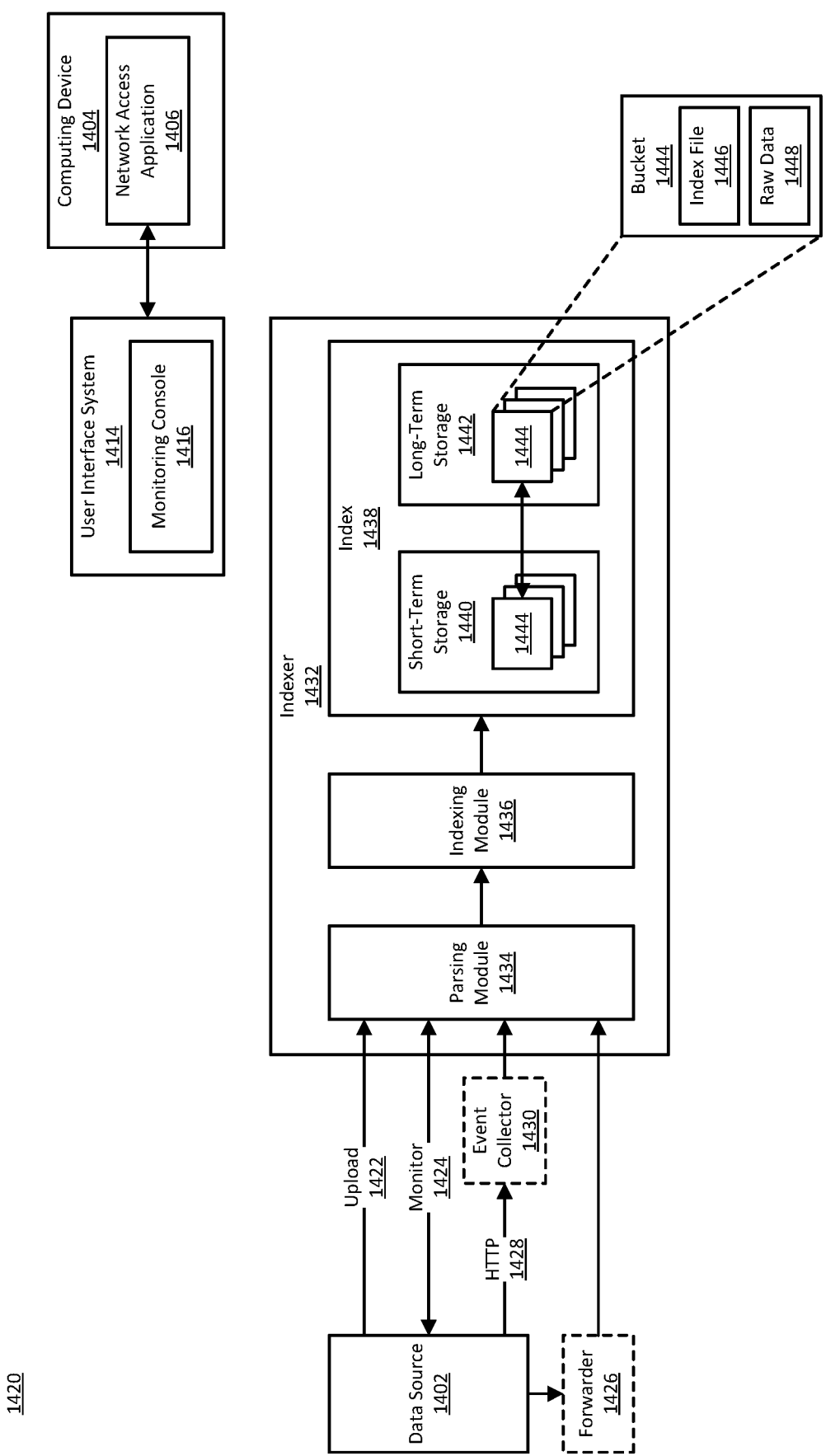
FIG. 14 is a block diagram illustrating in greater detail an example of an indexing system of a data intake and query system according to some examples.

FIG. 14 is a block diagram illustrating in greater detail an example of an indexing system 1420 of a data intake and query system, such as the data intake and query system 1310 of FIG. 13. The indexing system 1420 of FIG. 14 uses various methods to obtain machine data from a data source 1402 and stores the data in an index 1438 of an indexer 1432. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1420 enables the data intake and query system to obtain the machine data produced by the data source 1402 and to store the data for searching and retrieval.

Users can administer the operations of the indexing system 1420 using a computing device 1404 that can access the indexing system 1420 through a user interface system 1414 of the data intake and query system. For example, the computing device 1404 can be executing a network access application 1406, such as a web browser or a terminal, through which a user can access a monitoring console 1416 provided by the user interface system 1414. The monitoring console 1416 can enable operations such as: identifying the data source 1402 for indexing; configuring the indexer 1432 to index the data from the data source 1402; configuring a data ingestion method; configuring, deploying, and managing clusters of indexers; and viewing the topology and performance of a deployment of the data intake and query system, among other operations. The operations performed by the indexing system 1420 may be referred to as "index time" operations, which are distinct from "search time" operations that are discussed further below.

The indexer 1432, which may be referred to herein as a data indexing component, coordinates and performs most of the index time operations. The indexer 1432 can be implemented using program code that can be executed on a computing device. The program code for the indexer 1432 can be stored on a non-transitory computer-readable medium (e.g., a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1432. In some implementations, the indexer 1432 executes on the computing device 1404 through which a user can access the indexing system 1420. In some implementations, the indexer 1432 executes on a different computing device.

The indexer 1432 may be executing on the computing device that also provides the data source 1402 or may be executing on a different computing device. In implementations wherein the indexer 1432 is on the same computing device as the data source 1402, the data produced by the data source 1402 may be referred to as "local data." In other implementations the data source 1402 is a component of a first computing device and the indexer 1432 executes on a second computing device that is different from the first computing device. In these implementations, the data produced by the data source 1402 may be referred to as "remote data." In some implementations, the first computing device is "on-prem" and in some implementations the first computing device is "in the cloud." In some implementations, the indexer 1432 executes on a computing device in the cloud and the operations of the indexer 1432 are provided as a service to entities that subscribe to the services provided by the data intake and query system.

For a given data produced by the data source 1402, the indexing system 1420 can be configured to use one of several methods to ingest the data into the indexer 1432. These methods include upload 1422, monitor 1424, using a forwarder 1426, or using HyperText Transfer Protocol (HTTP 1428) and an event collector 1430. These and other methods for data ingestion may be referred to as "getting data in" (GDI) methods.

Using the upload 1422 method, a user can instruct the indexing system to specify a file for uploading into the indexer 1432. For example, the monitoring console 1416 can include commands or an interface through which the user can specify where the file is located (e.g., on which computing device and/or in which directory of a file system) and the name of the file. Once uploading is initiated, the indexer 1432 processes the file, as discussed further below. Uploading is a manual process and occurs when instigated by a user. For automated data ingestion, the other ingestion methods are used.

The monitor 1424 method enables the indexing system to monitor the data source 1402 and continuously or periodically obtain data produced by the data source 1402 for ingestion by the indexer 1432. For example, using the monitoring console 1416, a user can specify a file or directory for monitoring. In this example, the indexing system can execute a monitoring process that detects whenever data is added to the file or directory and causes the data to be sent to the indexer 1432. As another example, a user can specify a network port for monitoring. In this example, a monitoring process can capture data received at or transmitting from the network port and cause the data to be sent to the indexer 1432. In various examples, monitoring can also be configured for data sources such as operating system event logs, performance data generated by an operating system, operating system registries, operating system directory services, and other data sources.

Monitoring is available when the data source 1402 is local to the indexer 1432 (e.g., the data source 1402 is on the computing device where the indexer 1432 is executing). Other data ingestion methods, including forwarding and the event collector 1430, can be used for either local or remote data sources.

A forwarder 1426, which may be referred to herein as a data forwarding component, is a software process that sends data from the data source 1402 to the indexer 1432. The forwarder 1426 can be implemented using program code that can be executed on the computer device that provides the data source 1402. A user launches the program code for the forwarder 1426 on the computing device that provides the data source 1402. The user can further configure the program code, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1426 can provide various capabilities. For example, the forwarder 1426 can send the data unprocessed or can perform minimal processing on the data. Minimal processing can include, for example, adding metadata tags to the data to identify a source, source type, and/or host, among other information, dividing the data into blocks, and/or applying a timestamp to the data. In some implementations, the forwarder 1426 can break the data into individual events (event generation is discussed further below) and send the events to a receiver. Other operations that the forwarder 1426 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1430 provides an alternate method for obtaining data from the data source 1402. The event collector 1430 enables data and application events to be sent to the indexer 1432 using HTTP 1428. The event collector 1430 can be implemented using program code that can be executing on a computing device. The program code may be a component of the data intake and query system or can be a standalone component that can be executed independently of the data intake and query system and operates in cooperation with the data intake and query system.

To use the event collector 1430, a user can, for example using the monitoring console 1416 or a similar interface provided by the user interface system 1414, enable the event collector 1430 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1402 as an alternative method to using a username and password for authentication.

To send data to the event collector 1430, the data source 1402 is supplied with a token and can then send HTTP 1428 requests to the event collector 1430. To send HTTP 1428 requests, the data source 1402 can be configured to use an HTTP client and/or to use logging libraries such as those supplied by Java, JavaScript, and NET libraries. An HTTP client enables the data source 1402 to send data to the event collector 1430 by supplying the data, and a Uniform Resource Identifier (URI) for the event collector 1430 to the HTTP client. The HTTP client then handles establishing a connection with the event collector 1430, transmitting a request containing the data, closing the connection, and receiving an acknowledgment if the event collector 1430 sends one. Logging libraries enable HTTP 1428 requests to the event collector 1430 to be generated directly by the data source. For example, an application can include or link a logging library, and through functionality provided by the logging library manage establishing a connection with the event collector 1430, transmitting a request, and receiving an acknowledgement.

An HTTP 1428 request to the event collector 1430 can contain a token, a channel identifier, event metadata, and/or event data. The token authenticates the request with the event collector 1430. The channel identifier, if available in the indexing system 1420, enables the event collector 1430 to segregate and keep separate data from different data sources. The event metadata can include one or more key-value pairs that describe the data source 1402 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include event data and event metadata. Additionally, one request can include event data for one or more events.

In some implementations, the event collector 1430 extracts events from HTTP 1428 requests and sends the events to the indexer 1432. The event collector 1430 can further be configured to send events or event data to one or more indexers. Extracting the events can include associating any metadata in a request with the event or events included in the request. In these implementations, event generation by the indexer 1432 (discussed further below) is bypassed, and the indexer 1432 moves the events directly to indexing. In some implementations, the event collector 1430 extracts event data from a request and outputs the event data to the indexer 1432, and the indexer generates events from the event data. In some implementations, the event collector 1430 sends an acknowledgement message to the data source 1402 to indicate that the event collector 1430 has received a particular request form the data source 1402, and/or to indicate to the data source 1402 that events in the request have been added to an index.

The indexer 1432 ingests incoming data and transforms the data into searchable knowledge in the form of events. In the data intake and query system, an event is a single piece of data that represents activity of the component represented in FIG. 14 by the data source 1402. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1432 can include a parsing module 1434 and an indexing module 1436 for generating and storing the events. The parsing module 1434 and indexing module 1436 can be modular and pipelined, such that one component can be operating on a first set of data while the second component is simultaneously operating on a second sent of data. Additionally, the indexer 1432 may at any time have multiple instances of the parsing module 1434 and indexing module 1436, with each set of instances configured to simultaneously operate on data from the same data source or from different data sources. The parsing module 1434 and indexing module 1436 are illustrated to facilitate discussion, with the understanding that implementations with other components are possible to achieve the same functionality.

The parsing module 1434 determines information about event data, where the information can be used to identify events within the event data. For example, the parsing module 1434 can associate a source type with the event data. A source type identifies the data source 1402 and describes a possible data structure of event data produced by the data source 1402. For example, the source type can indicate which fields to expect in events generated at the data source 1402 and the keys for the values in the fields, and possibly other information such as sizes of fields, an order of the fields, a field separator, and so on. The source type of the data source 1402 can be specified when the data source 1402 is configured as a source of event data. Alternatively, the parsing module 1434 can determine the source type from the event data, for example from an event field or using machine learning.

Other information that the parsing module 1434 can determine includes timestamps. In some cases, an event includes a timestamp as a field, and the timestamp indicates a point in time when the action represented by the event occurred or was recorded by the data source 1402 as event data. In these cases, the parsing module 1434 may be able to determine from the source type associated with the event data that the timestamps can be extracted from the events themselves. In some cases, an event does not include a timestamp and the parsing module 1434 determines a timestamp for the event, for example from a name associated with the event data from the data source 1402 (e.g., a file name when the event data is in the form of a file) or a time associated with the event data (e.g., a file modification time). As another example, when the parsing module 1434 is not able to determine a timestamp from the event data, the parsing module 1434 may use the time at which it is indexing the event data. As another example, the parsing module 1434 can use a user-configured rule to determine the timestamps to associate with events.

The parsing module 1434 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1434 may be able to determine event boundaries from the source type associated with the event data, for example from a data structure indicated by the source type. In some implementations, a user can configure rules the parsing module 1434 can use to identify event boundaries.

The parsing module 1434 can further extract data from events and possibly also perform transformations on the events. For example, the parsing module 1434 can extract a set of fields for each event, such as a host or hostname, source or source name, and/or source type. The parsing module 1434 may extract certain fields by default or based on a user configuration. Alternatively or additionally, the parsing module 1434 may add fields to events, such as a source type or a user-configured field. As another example of a transformation, the parsing module 1434 can anonymize fields in events to mask sensitive information, such as social security numbers or account numbers. Anonymizing fields can include changing or replacing values of specific fields. The parsing module 1434 can further perform user-configured transformations.

The parsing module 1434 outputs the results of processing incoming event data to the indexing module 1436, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1432 can be configured to identify searchable segments that are parts of fields, searchable segments that are entire fields, or both. The parsing module 1434 organizes the searchable segments into a lexicon or dictionary for the event data, with the lexicon including each searchable segment and a reference to the location of each occurrence of the searchable segment within the event data. As discussed further below, the search system can use the lexicon, which is stored in an index file 1446, to find event data that matches a search query. In some implementations, segmentation can alternatively be performed by the forwarder 1426. Segmentation can also be disabled, in which case the indexer 1432 will not build a lexicon for the event data. When segmentation is disabled, the search system searches the event data directly.

Building index data structures generates the index 1438. The index 1438 is a storage data structure on a storage device (e.g., a disk drive or other physical device for storing digital data). The storage device may be a component of the computing device on which the indexer 1432 is operating (referred to herein as local storage) or may be a component of a different computing device (referred to herein as remote storage) that the indexer 1438 has access to over a network. The indexer 1432 can include more than one index and can include indexes of different types. For example, the indexer 1432 can include event indexes, which impose minimal structure on stored data and can accommodate any type of data. As another example, the indexer 1432 can include metrics indexes, which use a highly structured format to handle the higher volume and lower latency demands associated with metrics data.

The indexing module 1436 organizes files in the index 1438 in directories referred to as buckets. The files in a bucket 1444 can include raw data files, index files, and possibly also other metadata files. As used herein, "raw data" means data as when the data was produced by the data source 1402, without alteration to the format or content. As noted previously, the parsing module 1434 may add fields to event data and/or perform transformations on fields in the event data, and thus a raw data file 1448 can include, in addition to or instead of raw data, what is referred to herein as enriched raw data. The raw data file 1448 may be compressed to reduce disk usage. An index file 1446, which may also be referred to herein as a "time-series index" or tsidx file, contains metadata that the indexer 1432 can use to search a corresponding raw data file 1448. As noted above, the metadata in the index file 1446 includes a lexicon of the event data, which associates each unique keyword in the event data in the raw data file 1448 with a reference to the location of event data within the raw data file 1448. The keyword data in the index file 1446 may also be referred to as an inverted index. In various implementations, the data intake and query system can use index files for other purposes, such as to store data summarizations that can be used to accelerate searches.

A bucket 1444 includes event data for a particular range of time. The indexing module 1436 arranges buckets in the index 1438 according to the age of the buckets, such that buckets for more recent ranges of time are stored in short-term storage 1440 and buckets for less recent ranges of time are stored in long-term storage 1442. Short-term storage 1440 may be faster to access while long-term storage 1442 may be slower to access. Buckets may move from short-term storage 1440 to long-term storage 1442 according to a configurable data retention policy, which can indicate at what point in time a bucket is old enough to be moved.

A bucket's location in short-term storage 1440 or long-term storage 1442 can also be indicated by the bucket's status. As an example, a bucket's status can be "hot," "warm," "cold," "frozen," or "thawed." In this example, hot bucket is one to which the indexer 1432 is writing data and the bucket becomes a warm bucket when the indexer 1432 stops writing data to it. In this example, both hot and warm buckets reside in short-term storage 1440. Continuing this example, when a warm bucket is moved to long-term storage 1442, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1420 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can configured (e.g., three copies of each bucket must exist within the cluster), and indexers to which buckets are copied may be selected to optimize distribution of data across the cluster.

A user can view the performance of the indexing system 1420 through the monitoring console 1416 provided by the user interface system 1414. Using the monitoring console 1416, the user can configure and monitor an index cluster, and see information such as disk usage by an index, volume usage by an indexer, index and volume size over time, data age, statistics for bucket types, and bucket settings, among other information.

Figure 15:
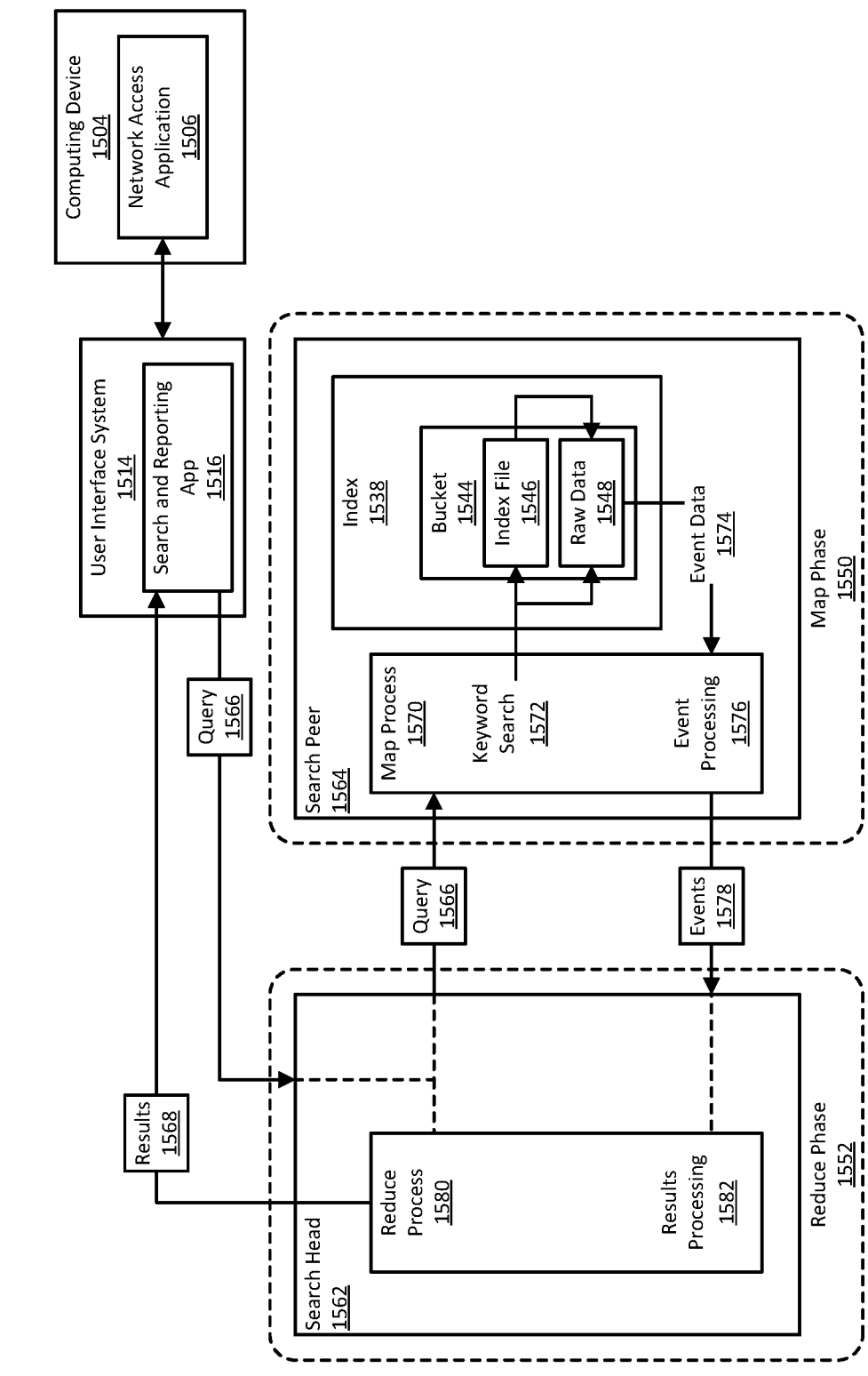
FIG. 15 is a block diagram illustrating in greater detail an example of the search system of a data intake and query system according to some examples.

FIG. 15 is a block diagram illustrating in greater detail an example of the search system 1560 of a data intake and query system, such as the data intake and query system 1310 of FIG. 13. The search system 1560 of FIG. 15 issues a query 1566 to a search head 1562, which sends the query 1566 to a search peer 1564. Using a map process 1570, the search peer 1564 searches the appropriate index 1538 for events identified by the query 1566 and sends events 1578 so identified back to the search head 1562. Using a reduce process 1582, the search head 1562 processes the events 1578 and produces results 1568 to respond to the query 1566. The results 1568 can provide useful insights about the data stored in the index 1538. These insights can aid in the administration of information technology systems, in security analysis of information technology systems, and/or in analysis of the development environment provided by information technology systems.

The query 1566 that initiates a search is produced by a search and reporting app 1516 that is available through the user interface system 1514 of the data intake and query system. Using a network access application 1506 executing on a computing device 1504, a user can input the query 1566 into a search field provided by the search and reporting app 1516. Alternatively or additionally, the search and reporting app 1516 can include pre-configured queries or stored queries that can be activated by the user. In some cases, the search and reporting app 1516 initiates the query 1566 when the user enters the query 1566. In these cases, the query 1566 maybe referred to as an "ad-hoc" query. In some cases, the search and reporting app 1516 initiates the query 1566 based on a schedule. For example, the search and reporting app 1516 can be configured to execute the query 1566 once per hour, once per day, at a specific time, on a specific date, or at some other time that can be specified by a date, time, and/or frequency. These types of queries maybe referred to as scheduled queries.

The query 1566 is specified using a search processing language. The search processing language includes commands that the search peer 1564 will use to identify events to return in the search results 1568. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1566 to include sequential commands, where a subsequent command may operate on the results of a prior command. As an example, sequential commands may be separated in the query 1566 by a vertical line ("|" or "pipe") symbol.

In addition to one or more search commands, the query 1566 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1566 occurs in two broad phases: a map phase 1550 and a reduce phase 1552. The map phase 1550 takes place across one or more search peers. In the map phase 1550, the search peers locate event data that matches the search terms in the search query 1566 and sorts the event data into field-value pairs. When the map phase 1550 is complete, the search peers send events that they have found to one or more search heads for the reduce phase 1552. During the reduce phase 1552, the search heads process the events through commands in the search query 1566 and aggregate the events to produce the final search results 1568.

A search head, such as the search head 1562 illustrated in FIG. 15, is a component of the search system 1560 that manages searches. The search head 1562, which may also be referred to herein as a search management component, can be implemented using program code that can be executed on a computing device. The program code for the search head 1562 can be stored on a non-transitory computer-readable medium and from this medium can be loaded or copied to the memory of a computing device. One or more hardware processors of the computing device can read the program code from the memory and execute the program code in order to implement the operations of the search head 1562.

Upon receiving the search query 1566, the search head 1562 directs the query 1566 to one or more search peers, such as the search peer 1564 illustrated in FIG. 15. "Search peer" is an alternate name for "indexer" and a search peer may be largely similar to the indexer described previously. The search peer 1564 may be referred to as a "peer node" when the search peer 1564 is part of an indexer cluster. The search peer 1564, which may also be referred to as a search execution component, can be implemented using program code that can be executed on a computing device. In some implementations, one set of program code implements both the search head 1562 and the search peer 1564 such that the search head 1562 and the search peer 1564 form one component. In some implementations, the search head 1562 is an independent piece of code that performs searching and no indexing functionality. In these implementations, the search head 1562 may be referred to as a dedicated search head.

The search head 1562 may consider multiple criteria when determining whether to send the query 1566 to the particular search peer 1564. For example, the search system 1560 may be configured to include multiple search peers that each have duplicative copies of at least some of the event data. In this example, the sending the search query 1566 to more than one search peer allows the search system 1560 to distribute the search workload across different hardware resources. As another example, search system 1560 may include different search peers for different purposes (e.g., one has an index storing a first type of data or from a first data source while a second has an index storing a second type of data or from a second data source). In this example, the search query 1566 may specify which indexes to search, and the search head 1562 will send the query 1566 to the search peers that have those indexes.

To identify events 1578 to send back to the search head 1562, the search peer 1564 performs a map process 1570 to obtain event data 1574 from the index 1538 that is maintained by the search peer 1564. During a first phase of the map process 1570, the search peer 1564 identifies buckets that have events that are described by the time indicator in the search query 1566. As noted above, a bucket contains events whose timestamps fall within a particular range of time. For each bucket 1544 whose events can be described by the time indicator, during a second phase of the map process 1570, the search peer 1564 performs a keyword search using search terms specified in the search query 1566. The search terms can be one or more of keywords, phrases, fields, Boolean expressions, and/or comparison expressions that in combination describe events being searched for. When segmentation is enabled at index time, the search peer 1564 performs the keyword search 1572 on the bucket's index file 1546. As noted previously, the index file 1546 includes a lexicon of the searchable terms in the events stored in the bucket's raw data 1548 file. The keyword search 1572 searches the lexicon for searchable terms that correspond to one or more of the search terms in the query 1566. As also noted above, the lexicon incudes, for each searchable term, a reference to each location in the raw data 1548 file where the searchable term can be found. Thus, when the keyword search identifies a searchable term in the index file 1546 that matches query 1566, the search peer 1564 can use the location references to extract from the raw data 1548 file the event data 1574 for each event that include the searchable term.

In cases where segmentation was disabled at index time, the search peer 1564 performs the keyword search 1572 directly on the raw data 1548 file. To search the raw data 1548, the search peer 1564 may identify searchable segments in events in a similar manner as when the data was indexed. Thus, depending on how the search peer 1564 is configured, the search peer 1564 may look at event fields and/or parts of event fields to determine whether an event matches the query 1566. Any matching events can be added to the event data 1574 read from the raw data 1548 file. The search peer 1564 can further be configured to enable segmentation at search time, so that searching of the index 1538 causes the search peer 1564 to build a lexicon in the index file 1546.

The event data 1574 obtained from the raw data 1548 file includes the full text of each event found by the keyword search 1572. During a third phase of the map process 1570, the search peer 1564 performs event processing 1576 on the event data 1574, with the steps performed being determined by the configuration of the search peer 1564 and/or commands in the search query 1566. For example, the search peer 1564 can be configured to perform field discovery and field extraction. Field discovery is a process by which the search peer 1564 identifies and extracts key-value pairs from the events in the event data 1574. The search peer 1564 can, for example, be configured to automatically extract the first 100 fields (or another number of fields) in the event data 1574 that can be identified as key-value pairs. As another example, the search peer 1564 can extract any fields explicitly mentioned in the search query 1566. The search peer 1564 can, alternatively or additionally, be configured with particular field extractions to perform.

Other examples of steps that can be performed during event processing 1576 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1564 sends processed events 1578 to the search head 1562, which performs a reduce process 1580. The reduce process 1580 potentially receives events from multiple search peers and performs various results processing 1582 steps on the events. The results processing 1582 steps can include, for example, aggregating the events from different search peers into a single set of events, deduplicating and aggregating fields discovered by different search peers, counting the number of events found, and sorting the events by timestamp (e.g., newest first or oldest first), among other examples. Results processing 1582 can further include applying commands from the search query 1566 to the events. The query 1566 can include, for example, commands for evaluating and/or manipulating fields (e.g., to generate new fields from existing fields or parse fields that have more than one value). As another example, the query 1566 can include commands for calculating statistics over the events, such as counts of the occurrences of fields, or sums, averages, ranges, and so on, of field values. As another example, the query 1566 can include commands for generating statistical values for purposes of generating charts of graphs of the events.

Through results processing 1582, the reduce process 1580 produces the events found by processing the search query 1566, as well as some information about the events, which the search head 1562 outputs to the search and reporting app 1516 as search results 1568. The search and reporting app 1516 can generate visual interfaces for viewing the search results 1568. The search and reporting app 1516 can, for example, output visual interfaces for the network access application 1506 running on a computing device 1504 to generate.

The visual interfaces can include various visualizations of the search results 1568, such as tables, line or area charts, Choropleth maps, or single values. The search and reporting app 1516 can organize the visualizations into a dashboard, where the dashboard includes a panel for each visualization. A dashboard can thus include, for example, a panel listing the raw event data for the events in the search results 1568, a panel listing fields extracted at index time and/or found through field discovery along with statistics for those fields, and/or a timeline chart indicating how many events occurred at specific points in time (as indicated by the timestamps associated with each event). In various implementations, the search and reporting app 1516 can provide one or more default dashboards. Alternatively or additionally, the search and reporting app 1516 can include functionality that enables a user to configure custom dashboards.

The search and reporting app 1516 can also enable further investigation into the events in the search results 1568. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1566. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 16:
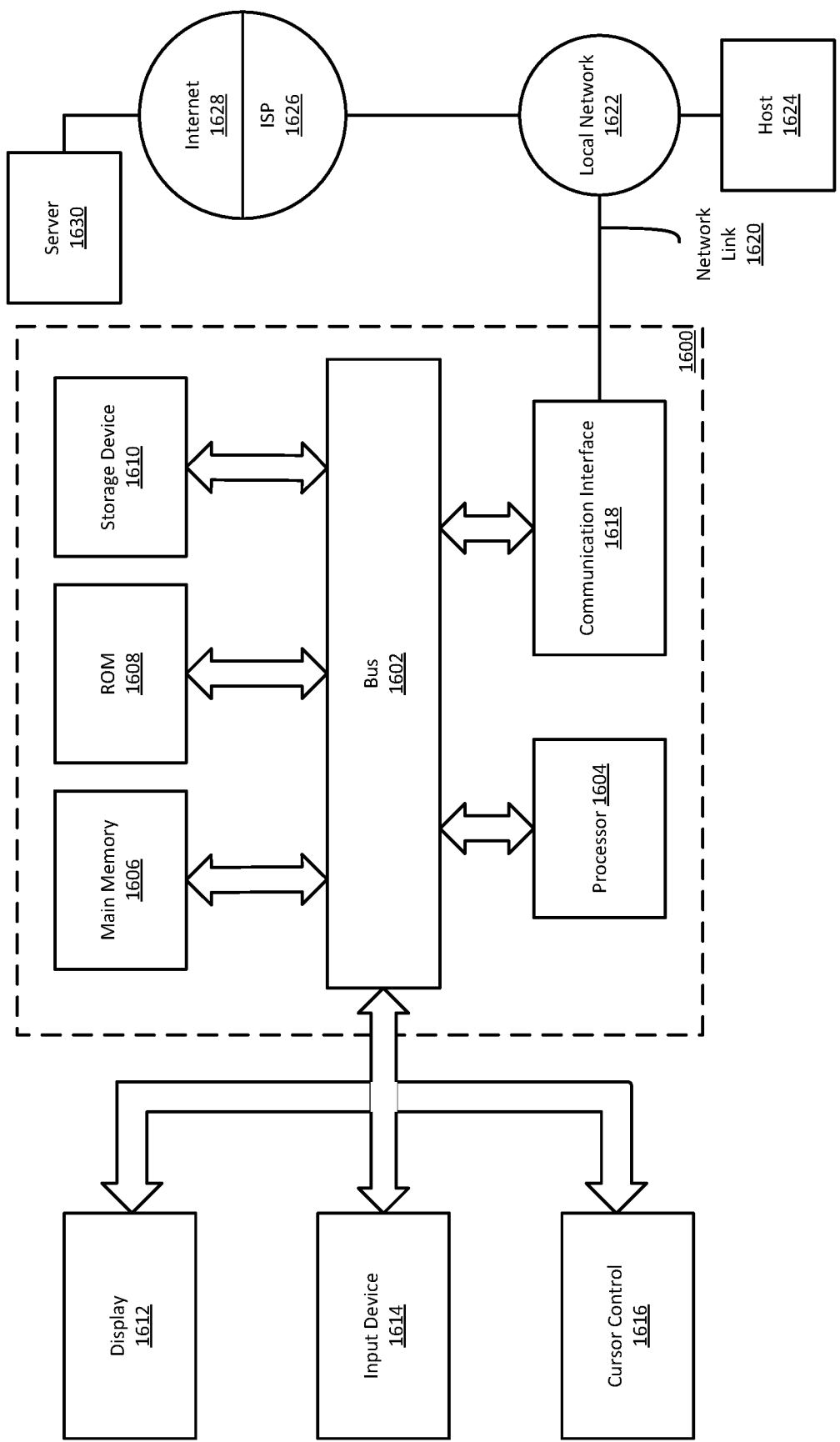
FIG. 16 is a block diagram illustrating an example computer system that may be used in some examples.

FIG. 16 is a block diagram that illustrates a computer system 1600 utilized in implementing the above-described techniques, according to an example. Computer system 1600 may be, for example, a desktop computing device, laptop computing device, tablet, smartphone, server appliance, computing mainframe, multimedia device, handheld device, networking apparatus, or any other suitable device.

Computer system 1600 includes one or more buses 1602 or other communication mechanism for communicating information, and one or more hardware processors 1604 coupled with buses 1602 for processing information. Hardware processors 1604 may be, for example, general purpose microprocessors. Buses 1602 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1600 also includes a main memory 1606, such as a random access memory (RAM) or other dynamic or volatile storage device, coupled to bus 1602 for storing information and instructions to be executed by processor 1604. Main memory 1606 also may be used for storing temporary variables or other intermediate information during execution of instructions to be executed by processor 1604. Such instructions, when stored in non-transitory storage media accessible to processor 1604, render computer system 1600 a special-purpose machine that is customized to perform the operations specified in the instructions.

Computer system 1600 further includes one or more read only memories (ROM) 1608 or other static storage devices coupled to bus 1602 for storing static information and instructions for processor 1604. One or more storage devices 1610, such as a solid-state drive (SSD), magnetic disk, optical disk, or other suitable non-volatile storage device, is provided and coupled to bus 1602 for storing information and instructions.

Computer system 1600 may be coupled via bus 1602 to one or more displays 1612 for presenting information to a computer user. For instance, computer system 1600 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light- Emitting Diode (LED) television. Other examples of suitable types of displays 1612 may include, without limitation, plasma display devices, projectors, cathode ray tube (CRT) monitors, electronic paper, virtual reality headsets, braille terminal, and/or any other suitable device for outputting information to a computer user. In an example, any suitable type of output device, such as, for instance, an audio speaker or printer, may be utilized instead of a display 1612.

One or more input devices 1614 are coupled to bus 1602 for communicating information and command selections to processor 1604. One example of an input device 1614 is a keyboard, including alphanumeric and other keys. Another type of user input device 1614 is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane. Yet other examples of suitable input devices 1614 include a touch-screen panel affixed to a display 1612, cameras, microphones, accelerometers, motion detectors, and/or other sensors. In an example, a network-based input device 1614 may be utilized. In such an example, user input and/or other information or commands may be relayed via routers and/or switches on a Local Area Network (LAN) or other suitable shared network, or via a peer-to-peer network, from the input device 1614 to a network link 1620 on the computer system 1600.

A computer system 1600 may implement techniques described herein using customized hard-wired logic, one or more ASICs or FPGAs, firmware and/or program logic which in combination with the computer system causes or programs computer system 1600 to be a special-purpose machine. According to one example, the techniques herein are performed by computer system 1600 in response to processor 1604 executing one or more sequences of one or more instructions contained in main memory 1606. Such instructions may be read into main memory 1606 from another storage medium, such as storage device 1610. Execution of the sequences of instructions contained in main memory 1606 causes processor 1604 to perform the process steps described herein. In other examples, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1610. Volatile media includes dynamic memory, such as main memory 1606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1602. Transmission media can also take the form of acoustic or light waves, such as those generated during radio-wave and infra-red data communications.

Various forms of media may be involved in carrying one or more sequences of one or more instructions to processor 1604 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 1600 can receive the data on the network and demodulate the signal to decode the transmitted instructions. Appropriate circuitry can then place the data on bus 1602. Bus 1602 carries the data to main memory 1606, from which processor 1604 retrieves and executes the instructions. The instructions received by main memory 1606 may optionally be stored on storage device 1610 either before or after execution by processor 1604.

A computer system 1600 may also include, in an example, one or more communication interfaces 1618 coupled to bus 1602. A communication interface 1618 provides a data communication coupling, typically two-way, to a network link 1620 that is connected to a local network 1622. For example, a communication interface 1618 may be an integrated services digital network (ISDN) card, cable modem, satellite modem, or a modem to provide a data communication connection to a corresponding type of telephone line. As another example, the one or more communication interfaces 1618 may include a local area network (LAN) card to provide a data communication connection to a compatible LAN. As yet another example, the one or more communication interfaces 1618 may include a wireless network interface controller, such as a 802.11-based controller, Bluetooth controller, Long Term Evolution (LTE) modem, and/or other types of wireless interfaces. In any such implementation, communication interface 1618 sends and receives electrical, electromagnetic, or optical signals that carry digital data streams representing various types of information.

Network link 1620 typically provides data communication through one or more networks to other data devices. For example, network link 1620 may provide a connection through local network 1622 to a host computer 1624 or to data equipment operated by a Service Provider 1626. Service Provider 1626, which may for example be an Internet Service Provider (ISP), in turn provides data communication services through a wide area network, such as the world-wide packet data communication network now commonly referred to as the "internet" 1628. Local network 1622 and Internet 1628 both use electrical, electromagnetic or optical signals that carry digital data streams. The signals through the various networks and the signals on network link 1620 and through communication interface 1618, which carry the digital data to and from computer system 1600, are example forms of transmission media.

In an example, computer system 1600 can send messages and receive data, including program code and/or other types of instructions, through the network(s), network link 1620, and communication interface 1618. In the Internet example, a server 1630 might transmit a requested code for an application program through Internet 1628, ISP 1626, local network 1622 and communication interface 1618. The received code may be executed by processor 1604 as it is received, and/or stored in storage device 1610, or other non-volatile storage for later execution. As another example, information received via a network link 1620 may be interpreted and/or processed by a software component of the computer system 1600, such as a web browser, application, or server, which in turn issues instructions based thereon to a processor 1604, possibly via an operating system and/or other intermediate layers of software components.

In some examples, some or all of the systems described herein may be or comprise server computer systems, including one or more computer systems 1600 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such examples may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective examples may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some examples the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some examples, certain operations, acts, events, or functions of any of the algorithms described herein can be performed in a different sequence, can be added, merged, or left out altogether (e.g., not all are necessary for the practice of the algorithms). In certain examples, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method comprising:
   causing an app editor interface of an of an information technology (IT) and security operations application to be presented, the app editor interface displaying a set of actions of an app under development by a user, wherein the app includes executable source code and configuration information that enables the IT and security operations application to interact with a specific type of computing resource for investigating or responding to detected security or operational issues, and wherein the computing resource corresponds to a third party computing device, application, or service accessible within a computing environment associated with the user;
   receiving, via use of the app editor interface, a request to add one or more new actions to the set of actions of the app under development;
   receiving, via use of the app editor interface, a request to test an action from the one or more new actions;
   testing the action by the IT and security operations application, the testing comprising transmitting commands to execute the action against the computing resource; and
   causing display, within the app editor interface, of console output describing execution of the action against the computing resource.

2. The method of claim 1, further comprising:
   assigning a draft status to the app under development in the app editor interface, wherein apps assigned the draft status are accessible to only a user developing the app;
   receiving input requesting to publish the app; and
   assigning a published status to the app, wherein apps assigned the published status are accessible to users with permissions to install published apps.

3. The method of claim 1, further comprising:
   receiving, via the app editor interface, input selecting the action associated with the app; and
   causing display within the app editor interface of source code implementing the action.

4. The method of claim 1, further comprising:
receiving input requesting to save the app; and
committing the executable source code and the configuration information of the app to a version control system.

5. The method of claim 1, wherein the IT and security operations application executes in a first computing environment, wherein the computing resource is located in a second computing environment that is external to the first computing environment, and wherein the IT and security operations application executes the action against the computing resource via an automation broker running in the second computing environment.

6. The method of claim 1, further comprising:
receiving, via the app editor interface, input indicating information about the app, wherein the information about the app includes a name of the app and a description of app functionality;
generating a template for the app based on the input, wherein the template for the app includes template source code and template configuration data; and
causing display of at least a portion of the template source code in the app editor interface.

7. The method of claim 1, further comprising:
receiving, via the app editor interface, input modifying at least a portion of the executable source code; and
receiving, via the app editor interface, input modifying at least a portion of the configuration information.

8. The method of claim 1, further comprising causing display of a navigation menu within the app editor interface, wherein the navigation menu displays information about actions included in the app, and wherein the information about actions included in the app is generated based on an analysis of the executable source code of the app.

9. The method of claim 1, further comprising:
receiving input requesting to save the app under development in the app editor interface;
assigning a version number to the app; and
storing a copy of the app in association with the version number.

10. The method of claim 1, further comprising:
validating a format of the configuration information; and
causing display, in the app editor interface, of results from validating the format of the configuration information.

11. The method of claim 1, further comprising:
causing display of the app editor interface including interface elements used to define a new action to be added to the app, wherein the new action is an action from the one or more new actions, wherein the interface elements include a first interface element used to specify a name of the new action and a second interface element used to specify a parameter of the new action;
receiving, via the app editor interface, input defining the new action; and
adding, by the IT and security operations application, source code to the app for the new action based on the input.

12. The method of claim 1, wherein the request to test the action includes input specifying a parameter value for the action, and wherein executing the action against the computing resource is based in part on the parameter value.

13. A computing device, comprising:
a processor; and
a non-transitory computer-readable medium having stored thereon instructions that, when executed by the processor, cause the processor to perform operations including:
causing an app editor interface of an of an information technology (IT) and security operations application to be presented, the app editor interface displaying a set of actions of an app under development by a user, wherein the app includes executable source code and configuration information that enables the IT and security operations application to interact with a specific type of computing resource for investigating or responding to detected security or operational issues, and wherein the computing resource corresponds to a third party computing device, application, or service accessible within a computing environment associated with the user;
receiving, via use of the app editor interface, a request to add one or more new actions to the set of actions of the app under development;
receiving, via use of the app editor interface, a request to test an action from the one or more new actions:
testing the action by the IT and security operations application, the testing comprising transmitting commands to execute the action against the computing resource; and
causing display, within the app editor interface, of console output describing execution of the action against the computing resource.

14. The computing device of claim 13, wherein the instructions, when executed by the processor, further cause the processor to perform operations including:
assigning a draft status to the app under development in the app editor interface, wherein apps assigned the draft status are accessible to only a user developing the app;
receiving input requesting to publish the app; and
assigning a published status to the app, wherein apps assigned the published status are accessible to users with permissions to install published apps.

15. The computing device of claim 13, wherein the instructions, when executed by the processor, further cause the processor to perform operations including:
receiving, via the app editor interface, input selecting the action associated with the app; and
causing display within the app editor interface of source code implementing the action.

16. The computing device of claim 13, wherein the instructions, when executed by the processor, further cause the processor to perform operations including:
receiving input requesting to save the app; and
committing the executable source code and the configuration information of the app to a version control system.

17. A non-transitory computer-readable medium having stored thereon instructions that, when executed by one or more processors, cause the one or more processors to perform operations including:
causing an app editor interface of an of an information technology (IT) and security operations application to be presented, the app editor interface displaying a set of actions of an app under development by a user, wherein the app includes executable source code and configuration information that enables the IT and security operations application to interact with a specific type of computing resource for investigating or responding to detected security or operational issues, and wherein the computing resource corresponds to a third party computing device, application, or service accessible within a computing environment associated with the user;

receiving, via use of the app editor interface, a request to add one or more new actions to the set of actions of the app under development;

receiving, via use of the app editor interface, a request to test an action from the one or more new actions;

testing the action by the IT and security operations application, the testing comprising transmitting commands to execute the action against the computing resource; and causing display, within the app editor interface, of console output describing execution of the action against the computing resource.

18. The computer-readable medium of claim 17, wherein the instructions, when executed by the one or more processors, further cause the one or more processors to perform operations including:

assigning a draft status to the app under development in the app editor interface, wherein apps assigned the draft status are accessible to only a user developing the app;

receiving input requesting to publish the app; and assigning a published status to the app, wherein apps assigned the published status are accessible to users with permissions to install published apps.

19. The computer-readable medium of claim 17, wherein the instructions, when executed by the one or more processors, further cause the one or more processors to perform operations including:

receiving, via the app editor interface, input selecting the action associated with the app; and causing display within the app editor interface of source code implementing the action.

20. The computer-readable medium of claim 17, wherein the instructions, when executed by the one or more processors, further cause the one or more processors to perform operations including:

receiving input requesting to save the app; and committing the executable source code and the configuration information of the app to a version control system.

* * * * *